US007865420B1

(12) United States Patent
Daman et al.

(10) Patent No.: US 7,865,420 B1
(45) Date of Patent: Jan. 4, 2011

(54) REAL TIME ELECTRONIC COMMERCE TELECOMMUNICATION SYSTEM AND METHOD

(75) Inventors: Willem Daman, Wintersprings, FL (US); James A. McInnes, Ferndale, FL (US)

(73) Assignee: Voyager Technologies, Inc., Longwood, FL (US)

( * ) Notice: Subject to any disclaimer, the term of this patent is extended or adjusted under 35 U.S.C. 154(b) by 3660 days.

(21) Appl. No.: 09/767,126

(22) Filed: Jan. 22, 2001

(51) Int. Cl.
*G06Q 40/00* (2006.01)
(52) U.S. Cl. .............................. 705/37; 705/30; 705/26; 705/27; 705/80
(58) Field of Classification Search .................... 705/30, 705/37, 26, 27, 80; 379/265.11
See application file for complete search history.

(56) References Cited

U.S. PATENT DOCUMENTS

| | | | |
|---|---|---|---|
| 4,412,287 A | 10/1983 | Braddock |
| 4,789,928 A | 12/1988 | Fujisaki |
| 4,799,156 A | 1/1989 | Shavit et al. |
| 5,136,501 A | 8/1992 | Silverman et al. |
| 5,243,515 A | 9/1993 | Lee |
| 5,270,921 A | 12/1993 | Hornick |
| 5,297,031 A | 3/1994 | Gutterman et al. |
| 5,689,652 A | 11/1997 | Lupien et al. |
| 5,715,402 A | 2/1998 | Popolo |
| 5,727,165 A | 3/1998 | Ordish et al. |
| 5,774,357 A | 6/1998 | Hoffberg et al. |
| 5,794,219 A | 8/1998 | Brown |
| 5,802,502 A | 9/1998 | Gell et al. |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,266 A | 12/1998 | Lupien et al. |
| 5,850,442 A | 12/1998 | Muftic |

(Continued)

FOREIGN PATENT DOCUMENTS

JP 03105273 6/1993

(Continued)

OTHER PUBLICATIONS

"Using Auctions to Divest Generation Assets", Electricity Journal, 10:10, Dec. 22-31, 1997.

(Continued)

*Primary Examiner*—Daniel S Felten
(74) *Attorney, Agent, or Firm*—Karl F. Milde, Jr.; Eckert Seamans Cherin & Mellott, LLC

(57) ABSTRACT

An auction system and method, which identifies at least one lot to be auctioned, having a plurality of units within the lot and associated auction parameters; transmits a remaining quantity of units within the lot from a central server to a plurality of remote locations; receives bid identifications for remaining units within the lot at the contemporaneous offering price from the plurality of remote locations; and decrements the offering price over time. The decrement may be adaptive to a bid activity pattern, and the bid activity pattern may be stored in a database. A local server may be provided to communicate between the central server and remote locations while changing the format of the information communicated. The packets preferably include compressed information, and preferably include quantity remaining information for a plurality of auction lots.

31 Claims, 8 Drawing Sheets

U.S. PATENT DOCUMENTS

| | | | |
|---|---|---|---|
| 5,890,138 | A | 3/1999 | Godin et al. |
| 5,897,620 | A | 4/1999 | Walker et al. |
| 5,905,975 | A | 5/1999 | Ausubel |
| 5,950,177 | A | 9/1999 | Lupien et al. |
| 5,964,836 | A | 10/1999 | Rowe et al. |
| 5,999,915 | A | 12/1999 | Nahan et al. |
| 6,044,363 | A | 3/2000 | Mori et al. |
| 6,230,146 | B1 * | 5/2001 | Alaia et al. .................. 705/37 |
| 6,449,601 | B1 * | 9/2002 | Friedland et al. .............. 705/37 |

FOREIGN PATENT DOCUMENTS

| | | |
|---|---|---|
| JP | 04031318 | 8/1993 |
| JP | 04076914 | 10/1993 |
| JP | 04076915 | 10/1993 |
| JP | 04068372 | 11/1993 |
| JP | 04095478 | 11/1993 |
| JP | 04095479 | 11/1993 |
| JP | 04109539 | 11/1993 |
| JP | 04109540 | 11/1993 |
| JP | 03142520 | 12/1993 |
| JP | 04155572 | 12/1993 |
| JP | 04156380 | 12/1993 |
| JP | 04156381 | 12/1993 |
| JP | 04195046 | 2/1994 |
| JP | 04240580 | 4/1994 |
| JP | 05101663 | 11/1994 |
| JP | 05101664 | 11/1994 |
| JP | 05176900 | 2/1995 |
| JP | 05201617 | 3/1995 |
| JP | 06096557 | 11/1995 |
| JP | 06107215 | 12/1995 |
| JP | 06185624 | 2/1996 |
| JP | 06185625 | 2/1996 |
| JP | 08161412 | 6/1996 |
| JP | 07095659 | 11/1996 |
| JP | 07143458 | 12/1996 |
| JP | 07150696 | 1/1997 |
| JP | 07260511 | 4/1997 |
| JP | 07301096 | 6/1997 |
| JP | 07301101 | 6/1997 |
| JP | 08336375 | 6/1997 |
| JP | 08218344 | 3/1998 |
| JP | 08233918 | 3/1998 |
| JP | 09282932 | 3/1999 |
| JP | 10048535 | 8/1999 |

OTHER PUBLICATIONS

Ausubel, et al, "Demand Reduction and Inefficiency in Multi-Unit Auctions", Univ. of Md, Mar. 20, 1998.

Ausubel, et al., "Vickrey Auctions with Reserve Pricing", Univ of Md, Jun. 28, 1999.

Klemper, "Auctions with Almost Common Values" . . . , Oxford Univ.

Klemperer, "Auction Theory and its Applictions to Economics".

"The Internet and Economics", http//www ex.ac.uk/RDavies/arian/internet.html.

Klemperer. "Auction Theory: A Guide to the Literature".

"Peter Cramton's HomePage", http//wwwcramton.umd.edu/auction-papers.htm.

Bulow, et al "Prices and the Winners Curse".

Cramton, "Ascending Auctions".

Fitzgibbon, "Investors shun Salon.com Dutch Auction", Redherring.com.

"Continuous Dutch Auction Bid Format", IAS—Dutch Auction, Format-http://cattleofferings.com/auction/dutch/dutchformat_tech.ht.

"About the Klik-Klok Dutch Auction, Klik-Klok Online Dutch Auction", http://www.klik-klok.com/how.htm.

Banatre, et al., "The Design and Building of Enchere . . . ," Computing Practices, Jan. 29, 1986, No. 1, pp. 19-29.

"The Bobcad Dutch Auction", http/www.vectorcam.com/dutchchance.htm "A Dutch Auction", http//www.agonics.com/auctions/acution3.htm.

(2)treeoverview-http.//www.icw.unizh.ch/ztree/tipstricks.htm.

Kumar et al. "IBM Inst for Adv.Commerce, Reports, Technical Papers"http://www.ibm.com/iac/reports-techical/reports-bus-neg-internet.htm.

"ACE Market Operations Guide", Sholtz&Assoc. Jan. 3, 1996.

Marimba—Customer Profile.

Marimba—On Sale, Marimba—Press Release—"Internet Auction House Onsale . . . ".

Marimba-Press Release—"Marmba's Castaner Selected . . . ".

Youngworth, "Internet Acution House Offers Personalized Approach to E-Business", e-BusinessMag. Sep. 1998.

Hatlestad, "Plumbers Helpers", RedHerringMagazine, Nov. 1998.

"Joint Report on the Government Securities Market", Jan. 1992.

Dialog(R) File 610: Business Wire 0489276—BW 0022 "Onsale: brings thrill of Auctions . . . ", May 24, 1995.

Dialog (R) File 609:KR/T Bus.News—2096205;5519 "California 'Computer' Auctions No Boon for Bargain Hunters", Sep. 13, 1993.

Dialog (R) File 16: PROMT(R)—03482064—"Car auction into Space", Automotive News, Nov. 25, 1991, p. 6.

Dialog (R) File 16: IAC PROMT (R)—05649796—"Onsale joins fray as online shopping picks up speed", Computer Reseller News Jun. 5, 1995, p. 73.

Dialog(R)File 148: IAC Trade and Industry Database, "Nowhere to Go but up", PC Week, Oct. 23, 1995.

"Dutch Auction Interest and Dividend Reset," http:/risk.ifci.ch/00011235, Dutch Auction; http://risk.ifci.ch/00011234.htm.

"Dutch Auction Rate Transferable Securities (DARTS)"; http//risk.ifci.ch/0011236.

"Westpoint Stevens Commences Dutch Auction Tender Offier for Up to 3,000,000Shares of Common Stock"; http://biz.yahoo.com/bw/991029/ga_westpo_html.

"Continuous Dutch Auction Bid Format"; http://cattleofferings.com/-auction/dutch/dutchformat_text.html.

Fitzgibbon, "The Fine bouquet of a Dutch auction", wysiwyg://http://www.redherring.com/insider/1999/0402/inv-dutchauction.htm.

"DutchAuction"; http://ai.wwcd.com/auction/wwed/help/dutch-help.html.

"DutchAuctions", http://www.bidwerx.com/auctions_dutch.html.

"AuctionTypes-Dutch"; http://www.agorics.com/auctions/auction3.html.

"Revenue Ruling Regarding the Dutch Auction Rate Issued"; http://www.unclefed.com/Tax-News/1990/Nr90-48.html.

Brown Lee: "Salon IPO Bombs on 1st Day of trading" http://www.nypost.com/business/9661.htm.

"Bidders/Buyers FAQ's"; http://www.goldsauction.com/html/buyerFAK.html.

"Technical Papers—Business Negotiaitons on the Internet"; http://www.ibm.com/iac/reports-technical/reports-bus-neg-internet.html.

Gonzales, "Arrest of ships in the Netherlands Antilles and Aruba"; http://www.na-law.com/law/article2.htm.

"Z-Tree:Tips and Tricks"; http://www.iew.unizh.ch/ztree/tipstricks.htms. "Dutch Sequential Auctions", http://www.jdawiseman.com/papers/Einmkts/dutchesq.html.

"What is a Dutch Auction and how does it work"; http://www.dnoz.org/Shopping/Auctions/Dutch_Auctions/desc.htm/.

"Selling After the Close of your Auction", http://www.liquidation.com/service/faq_sellers.html.

"BigTimeAnalyst Goes Internet: Hambrecht Goes Dutch Auction; Portals GoE-Commerce", http://www.portal-to-wallstreet.com/OPED/11A/9906jw.html.

"Knowledge Market™ Information-Auction Types"; wyswyg://280/http://www.intellifract.com/auction/types.htm.

Kumar; "Business Negotiations on the Internet"; http://www.isoc.org/inet98/proceedings/3b/36_3.

"Welcome to the Timeshare Auction"; http://www.thetimeshareauction.com/newuser.shtml.

"Help for Buyers" http://www.gofish.com.cufmembers/ReviewingA Listing.htm.

"AuctionFormatts", http://pages.com.ebay.com/aw/help-faq-format.html.

Connolly; "Going Once, Going Twice"; wysiwyg://id http://www.zdnet.com/products/stories/reviews/0,4161,2306286,00.htm.

Junnarkar, "Plans auction site for second-hand goods"; http://news.cnet.com/news/0-1007-200-1506830.html.

US 6,000,826, 12/1999, Parunak et al. (withdrawn)

* cited by examiner

Chicago to London (Heathrow) — 36

Passengers
McInnes, Jim — 37

Itinerary
Flight VS040 - Sunday, Mar 12
Departing Chicago at 5:00P arriving in London (Heathrow) on Monday Mar 13 at 6:55A.

Flight VS039 - Wednesday, Mar 22
Departing London (Heathrow) at 10:30A arriving in Chicago on Wednesday Mar 22 at 2:10P.

— 38

Delivery Method: Mail $14.95 | Over Night $24.95 | E-Ticket $9.95

Purchase Confirmed
Pending Credit
Approval.

39

1 Tickets $ 324.00 each: 324.00
E-Ticket delivery: 9.95
Total charged to your credit card: $ 333.95 — 40

RETURN  PRINT
  41    42

Fig. 7

REAL TIME ELECTRONIC COMMERCE TELECOMMUNICATION SYSTEM AND METHOD

FIELD OF THE INVENTION

The present invention relates to the field of transaction processing networks including electronic commerce systems and methods, and more particular to those employing client-server architectures. The present invention also relates to electronic auction systems and methods, for example providing real time performance through switched packet networks.

BACKGROUND OF THE INVENTION

Internet

The Internet is structured such various networks are interconnected, with communications effected by addressed packets conforming to a common protocol. Based on the packet addressing, information is routed from source to destination, often through a set of networks having multiple potential pathways. The communications medium is shared between all users. Statistically, some proportion of the packets are extraordinarily delayed, or simply lost. Therefore, protocols involving communications using these packets include error detection schemes that request a retransmit of required data not received within a time window. In the even that the network nears capacity or is otherwise subject to limiting constraint, the incidence of delayed or lost packets increases, thereby increasing requests for retransmission and retransmission. Therefore, as the network approaches available bandwidth, the load increases, ultimately leading to failure. In instances where a minimum quality of service must be guaranteed, special Internet technologies are required, to reserve bandwidth or to specify network pathways. End-to-end quality of service guarantees, however, may exceed the cost of circuit switched technologies, such as dialup modems, especially where the high quality needs are intermittent.

Internet usage typically involves an Internet server, an automated system capable of responding to communications received through the Internet, and often communicating with other systems not directly connected to the Internet. The server typically has relatively large bandwidth to the Internet, allowing multiple simultaneous communications sessions, and usually supports the hypertext transport protocol (HTTP), which provides, in conjunction with a so-called web browser on a remote client system, a human readable interface which facilitates navigation of various resources available in the Internet. The client systems are typically human user interfaces, which employ a browser to display HTTP "web pages". The browser typically does not provide intelligence. Bandwidth between the client and Internet is typically relatively small, and various communications and display rendering considered normal. Typically, both client and server are connected to the Internet through Internet service providers, each having its own router.

It is also known to provide so-called proxy servers and firewalls, which are automated systems that insulate the client system from the Internet. Further, so-called Internet applications and applets are known which provide local intelligence at the client system. Further, it is known to provide a local server within the client system for locally processing a portion of the information. These local servers, applications and applets are non-standard, and thus require special software to be available locally for execution.

Thus, the Internet poses a number of advantages for commercial use, including low cost and ubiquitous connectivity. Therefore, it is desirable to employ standard Internet technologies while achieving sufficient quality communications to effect an efficient transaction.

Electronic Commerce

There is presently a high degree of interest in employing the Internet, an international set of interconnected networks with uniform protocols and addressing schemes, for conducting commercial transactions. Implementations of so-called e-commerce systems raise many issues distinct from personal contact business relationships. Further, the growing prominence of electronic commerce is altering the conduct of diverse businesses, even those that do not directly conduct business transactions on-line.

Further, traditional Internet e-commerce systems require a substantial amount of information to be communicated, both to inform the potential bidder of the nature and quantity of goods available for auction, and to identify and submit an offer. In secure systems, an additional layer of overhead is generated, increasing traffic volume and communications processing for both sender and receiver.

Market Economy Systems

In modern retail transactions, predetermined price transactions are common, with market transactions, i.e., commerce conducted in a setting which allows the transaction price to float based on the respective valuation allocated by the buyer(s) and seller(s), often left to specialized fields. While interpersonal negotiation is often used to set a transfer price, this price is often different from a transfer price that might result from a best-efforts attempt at establishing a market price. Assuming that the market price is optimal, it is therefore assumed that alternatives are sub optimal. Therefore, the establishment of a market price is desirable over simple negotiations.

One particular problem with market-based commerce is that both seller optimization and market efficiency depend on the fact that representative participants of a preselected class are invited to participate, and are able to promptly communicate, on a relevant timescale, in order to accurately value the goods or services and make an offer. Thus, in traditional market-based system, all participants are in the same room, or connected by a high quality telecommunications link. Alternately, the market valuation process is prolonged over an extended period, allowing non-real time communications of market information and bids. Thus, attempts at ascertaining a market price for non-commodity goods can be subject to substantial inefficiencies, which reduce any potential gains by market pricing. Further, while market pricing might be considered "fair", it also imposes an element of risk, reducing the ability of parties to predict future pricing and revenues. Addressing this risk may also reduce efficiency of a market-based system.

Auction Systems

When a single party seeks to sell goods to the highest valued purchaser(s), to establish a market price, the rules of conduct typically define an auction. Typically, known auctions provide an ascending price or descending price over time, with bidders making offers or ceasing to make offers, in the descending price or ascending price models, respectively, to define the market price. After determining the winner of the auction, the pricing rules define uniform price auctions, wherein all successful bidders pay the lowest successful bid, second price auctions wherein the winning bidder pays the amount bid by the next highest bidder, and pay-what-you-bid auctions. The pay-what-you-bid auction is also known as a discriminative auction while the uniform price auction is known as a non-discriminative auction. In a second-price auction, also known as a Vickrey auction, the policy seeks to create a disincentive for speculation and to encourage bidders to submit bids reflecting their true value for the good. In the uniform price and second price schemes, the bidder is encourages to disclose the actual private value to the bidder of the good or service, since at any price below this amount, there is an excess gain to the buyer, whereas by withholding this amount the bid may be unsuccessful, resulting in a loss of the presumably desirable opportunity. In the pay-what-you-bid auction, on the other hand, the buyer need not disclose the maximum private valuation, and those bidders with lower risk tolerance will bid higher prices. See, www.isoc.org/inet98/proceedings/3b/3b_3.html; www.ibm.com/iac/reports-technical/reports-bus-neg-internet.html.

Two common types of auction are the English auction, which sells a single good to the highest bidder in an ascending price auction, and the Dutch auction, in which multiple units are available for sale, and in which a starting price is selected by the auctioneer, which is successively reduced, until the supply is exhausted by bidders (or the minimum price/final time is reached), with the buyer(s) paying the lowest successful bid. The term Dutch auction is also applied to a type of sealed bid auction. In a multi-unit live Dutch auction, each participant is provided with the current price, the quantity on hand and the time remaining in the auction. This type of auction, typically takes place over a very short period of time and there is a flurry of activity in the last portion of the auction process. The actual auction terminates when there is no more product to be sold or the time period expires.

In selecting the optimal type of auction, a number of factors are considered. In order to sell large quantities of a perishable commodity in a short period of time, the descending price auctions are often preferred. For example, the produce and flower markets in Holland routinely use the Dutch auction (hence the derivation of the name), while the U.S. Government uses this form to sell its financial instruments. The format of a traditional Dutch auction encourages early bidders to bid up to their "private value", hoping to pay some price below the "private value". In making a bid, the "private value" becomes known, helping to establish a published market value and demand curve for the goods, thus allowing both buyers and sellers to define strategies for future auctions.

In an auction, typically a seller retains an auctioneer to conduct an auction with multiple buyers. (In a reverse auction, a buyer solicits the lowest price from multiple competing vendors for a desired purchase). Since the seller retains the auctioneer, the seller essentially defines the rules of the auction. These rules are typically defined to maximize the revenues or profit to the seller, while providing an inviting forum to encourage a maximum number of high valued buyers. If the rules discourage high valuations of the goods or services, or discourage participation by an important set of potential bidders, then the rules are not optimum. A rule may also be imposed to account for the valuation of the good or service applied by the seller, in the form of a reserve price. It is noted that these rules typically seek to allocate to the seller a portion of the economic benefit that would normally inure to the buyer, creating an economic inefficiency. However, since the auction is to benefit the seller, not society as a whole, this potential inefficiency is tolerated. An optimum auction thus seeks to produce a maximum profit (or net revenues) for the seller. An efficient auction, on the other hand, maximizes the sum of the utilities for the buyer and seller. It remains a subject of academic debate as to which auction rules are most optimum in given circumstances; however, in practice, simplicity of implementation may be a paramount concern, and simple auctions may result in highest revenues; complex auctions, while theoretically more optimal, may discourage bidders from participating or from applying their true and full private valuation in the auction process.

Typically, the rules of the auction are predefined and invariant. Further, for a number of reasons, auctions typically apply the same rules to all bidders, even though, with a priori knowledge of the private values assigned by each bidder to the goods, or a prediction of the private value, an optimization rule may be applied to extract the full value assigned by each bidder, while selling above the sellers reserve.

In a known ascending price auction, each participant must be made aware of the status of the auction, e.g., open, closed, and the contemporaneous price. A bid is indicated by the identification of the bidder at the contemporaneous price, or occasionally at any price above the minimum bid increment plus the previous price. The bids are asynchronous, and therefore each bidder must be immediately informed of the particulars of each bid by other bidders.

In a known descending price auction, the process traditionally entails a common clock, which corresponds to a decrementing price at each decrement interval, with an ending time (and price). Therefore, once each participant is made aware of the auction parameters, e.g., starting price, price decrement, ending price/time, before the start of the auction, the only information that must be transmitted is auction status (e.g., inventory remaining).

As stated above, an auction is traditionally considered an efficient manner of liquidating goods at a market price. The theory of an auction is that either the buyer will not resell, and thus has an internal or private valuation of the goods regardless of other's perceived values, or that the winner will resell, either to gain economic efficiency or as a part of the buyers regular business. In the later case, it is a general presumption that the resale buyers are not in attendance at the auction or are otherwise precluded from bidding, and therefore that, after the auction, there will remain demand for the goods at a price in excess of the price paid during the auction. Extinction of this residual demand results in the so-called "winner's curse", in which the buyer can make no profit from the transaction during the auction. Since this detracts from the value of the auction as a means of conducting profitable commerce, it is of concern to both buyer and seller. In fact, experience with initial public offerings (IPOs) of stock through various means has demonstrated that by making stock available directly to all classes of potential purchasers, latent demand for a new issue is extinguished, and the stock price is likely to decline after issuance, resulting in an IPO which is characterized as "unsuccessful". This potential for post IPO decline tempers even initial interest in the issue, resulting in a paradoxical decline in revenues from the vehicle. In other words, the "money on the table" resulting from immediate retrading of IPO shares is deemed a required aspect of the IPO process. Thus, methods that retain latent demand after IPO shares result in post IPO increases, and therefore a "successful" IPO. Therefore, where the transaction scheme anticipates demand for resale after the initial distribution, it is often important to assure a reasonable margin for resellers and limitations on direct sale to ultimate consumers.

Research into auction theory (game theory) shows that in an auction, the goal of the seller is to optimize the auction by allocating the goods inefficiently, and thus to appropriate to himself an excess gain. This inefficiency manifests itself by either withholding goods from the market or placing the goods in the wrong hands. In order to assure for the seller a maximum gain from a misallocation of the goods, restrictions on resale are imposed; otherwise, post auction trading will tend to undue the misallocation, and the anticipation of this trading will tend to control the auction pricing. The misallocation of goods imposed by the seller through restrictions allow the seller to achieve greater revenues than if free resale were permitted. It is believed that in an auction followed by perfect resale, that any mis-assignment of the goods lowers the seller's revenues below the optimum and likewise, in an auction market followed by perfect resale, it is optimal for the seller to allocate the goods to those with the highest value. Therefore, if post-auction trading is permitted, the seller will not benefit from these later gains, and the seller will obtain sub optimal revenues.

These studies, however, typically do not consider transaction costs and internal inefficiencies of the resellers, as well as the possibility of multiple classes of purchasers, or even multiple channels of distribution, which may be subject to varying controls or restrictions, and thus in a real market, such theoretical optimal allocation is unlikely. In fact, in real markets the transaction costs involved in transfer of ownership are often critical in determining a method of sale and distribution of goods. For example, it is the efficiency of sale that motivates the auction in the first place. Yet, the auction process itself may consume a substantial margin, for example 1-15% of the transaction value. To presume, even without externally imposed restrictions on resale, that all of the efficiencies of the market may be extracted by free reallocation, ignores that the motivation of the buyer is a profitable transaction, and the buyer may have fixed and variable costs on the order of magnitude of the margin. Thus, there are substantial opportunities for the seller to gain enhanced revenues by defining rules of the auction, strategically allocating inventory amount and setting reserve pricing.

Therefore, perfect resale is but a fiction created in auction (game) theory. Given this deviation from the ideal presumptions, auction theory may be interpreted to provide the seller with a motivation to misallocate or withhold based on the deviation of practice from theory, likely based on the respective transaction costs, seller's utility of the goods, and other factors not considered by the simple analyses.

A number of proposals have been made for effecting auction systems using the Internet. These systems include consumer-to-consumer, business-to-consumer, and business-to-business types. Generally, these auctions, of various types and implementations discussed further below, are conducted through Internet browsers using hypertext markup language (HTML) "web pages", using HTTP. In some instances, such as BIDWATCH, discussed further below, an application with associated applets is provided to define a user interface instead of HTML.

As stated above, the information packets from the transaction server to client systems associated with respective bidders communicate various information regarding the status of an interactive auction during the progress thereof. The network traffic from the client systems to the transaction server is often limited to the placement of bids; however, the amount of information required to be transmitted can vary greatly, and may involve a complex dialogue of communications to complete the auction offer. Typically, Internet based auction systems have scalability issues, wherein economies of scale are not completely apparent, leading to implementation of relatively large transaction server systems to handle peak loads. When the processing power of the transaction server system is exceeded, entire system outages may occur, resulting in lost sales or diminished profits, and diminished goodwill.

In most Internet auction system implementations, there are a large quantity of simultaneous auctions, with each auction accepting tens or hundreds of bids over a timescale of hours to days. In systems where the transaction volume exceeds these scales, for example in stock and commodity exchanges, which can accommodate large numbers of transactions per second involving the same issue, a private network, or even a local area network, is employed, and the public Internet is not used as a direct communications system with the transaction server. Thus, while infrastructures are available to allow successful handling of massive transaction per second volumes, these systems typically avoid direct public Internet communications or use of some of its limiting technologies. The transaction processing limitations are often due to the finite time required to handle, e.g., open, update, and close, database records.

In business-to-business auctions, buyers seek to ensure that the population of ultimate consumers for the good or services are not present at the auction, in order to avoid the "winner's curse", where the highest bidder in the auction cannot liquidate or work the asset at a profit. Thus, business-to-business auctions are distinct from business-to-consumer auctions. In the former, the optimization by the seller must account for the desire or directive of the seller to avoid direct retail distribution, and instead to rely on a distribution tier represented in the auction. In the latter, the seller seeks maximum revenues and to exhaust the possibilities for downstream trade in the goods or services. In fact, these types of auctions may be distinguished by various implementing rules, such as requiring sales tax resale certificates, minimum lot size quantities, preregistration or qualification, support or associated services, or limitations on the title to the goods themselves. The conduct of these auctions may also differ, in that consumer involvement typically is permissive of mistake or indecision, while in a pure business environment professionalism and decisiveness are mandated.

In many instances, psychology plays an important role in the conduct of the auction. In a live auction, bidders can see each other, and judge the tempo of the auction. In addition, multiple auctions are often conducted sequentially, so that each bidder can begin to understand the other bidder's patterns, including hesitation, bluffing, facial gestures or mannerisms. Thus, bidders often prefer live auctions to remote or automated auctions if the bidding is to be conducted strategically.

Airline Tickets

In the case of airline ticket distribution through the Internet, a number of factors provide very real constraints on the auction process. For example, there are a number of sources for essentially identical (or strictly higher valued) goods, typically with a fixed sale value. In other words, tickets are available at a fixed price through the computerized reservation system (CRS) employed by travel agents, thus establishing a maximum price, at which supply generally exceeds demand. Thus, the maximum selling price is typically well defined. Most routes also have multiple carriers, providing external competition for the seller. It is also considered generally important that auction parameters be maintained in general secrecy, especially before the auction, in order to prevent a competing seller from preempting sales by offering a "better deal". This may be accomplished by maintaining the starting price, price increment and minimum price in confidence.

Airline ticket buyers are typically classified as business or leisure. The leisure traveler is characterized by the possibility of advance purchase of tickets and willingness to purchase a round trip ticket with a Saturday night stopover. On the other hand, business travelers typically travel on short lead times, and travel on weekdays, returning before the weekend. Leisure travelers are typically more price sensitive than business travelers. Therefore, airline yield management systems seek to maximize revenues by providing attractive fares to leisure travelers more than two or three weeks prior to departure, and subsequently raising fares in order to capture maximum profits from business travelers. Fares are also set in response to so-called fare wars between carriers, seasonal variations, and remaining inventory. Automated airline ticket yield management systems are typically employed to define these fares. In order to provide predictable alterations in fares, a set of rules are defined for different classes of fares, such as advance purchase requirements, Saturday night stopovers, holiday blackout periods, resale restrictions, and itinerary change fees. These rules may be common throughout the industry, or customized.

There are typically two quite distinct motivations for conducting an auction of airline seats. First, in a business-to-business context, an auction provides a potentially efficient means for transferring inventory to so-called "aggregators" or "consolidators", i.e., resellers of seats. These aggregators, in turn, may seek to fill their own predicted needs, or to define a tour group. In the former case, since demand is likely to be price sensitive, the total number of seats, as well as their specific distribution through available flights, will depend on the price point. In the later case, a relatively large block of seats will be required, and the specific price per seat may be less important than the economies of scale afforded by a large block. The aggregators thus seek to efficiently procure inventory for their predicted needs, and must do so in an efficient, business-like manner, with little wasted time. Traditionally, aggregators negotiate price and volume directly with airlines. Often, aggregators return inventory to the airline if unsold, causing a variable number of unsold seats to return to inventory shortly before departure. Statistically, the airlines expect such returns, and reallocate these seats to later, higher fare travelers. Thus, prediction of the number of returns is important to assuring maximum profits.

It is also noted that the sales to aggregators are may be affected by marketing schemes employed by various carriers, since these ultimately compete in the marketplace. There mere possibility of such variations in pricing of direct sales by airlines will impact the valuation placed on the tickets by aggregators and the public. Since, the aggregators serve a very real need of the carriers, that of low cost distribution of inventory, and typically account for about 30% of ticket sales, the carriers rely on this distribution channel and would prefer not to undermine it. Thus, a proper a priori model of supply and demand is preferred to midstream corrections in pricing, such as by a sale or fare war.

The main distribution channels for airline tickets are the aforementioned aggregators, direct sales by the airlines, and the above-mentioned computerized reservation system (CRS), such as SABRE, which serves the need of travel agents. These CRS systems provide an agency fee to the selling travel agent, as well as various rules defining payments to the carrier. Typically, tickets sold through a CRS have a published price for a class of ticket, and are sold on a first-come, first served basis through authorized agents. In some cases, the CRS price is unpublished, and merely establishes a minimum price, such as tickets sold through Priceline.com. Once a ticket is sold through a CRS, the transaction is cleared through the airline host computer to take the seat out of inventory.

At present, direct sales of airline tickets through the Internet by carriers have emerged. In this case, typically the Internet web server interfaces with the airline mainframe, and thus these "direct" sales compete directly with the CRS system, at lower transactional cost to the airline due to the direct sales and elimination of agent commissions. Often, the sole use of these web sites make comparison-shopping less convenient, since each Internet web site typically caters to only a single carrier. Typically, the sales price through the Internet are at the same price as through the CRS, although various incentives, such as bonus frequent flyer miles, may be awarded for direct booking through the carrier's web site. Thus, for at least a portion of the sales, the Internet has proven efficient.

Traditionally, aggregators have directly negotiated with airlines for tickets. Therefore, the possibility of favoritism and inconsistency is significant. There is no existing market mechanism for pricing of tickets to aggregators, yielding little present choice. Therefore, there exists a present need for a system and method for establishing a market price for airline tickets to aggregators, for example by efficient auction. Since aggregators tend to be geographically dispersed, face-to-face auctions would be difficult to implement. One method of alleviating the problems of remote auctions is through the use of videoconferencing technologies. This, however, is expensive and has substantial scalability issues.

Proxy bidding, including absentee proxy bidding, is well known in both live and automated auctions. Bidders, however, are typically constrained to defining a maximum bid price, without other control parameters.

PRICELINE.COM, and Walker Digital, a related company, have developed systems for the sale of airline tickets and travel accommodations, which are especially suited for consumer transactions, and in fact, are in many ways intended to exclude business transactions. For example, PRICELINE.COM runs a matching service for the sale of airline tickets. In one sense, since potential buyers place bids for tickets, the system seeks to establish a market price; however, in implementation, bidders do not compete with each other, except in a general way, and rather negotiate with the airline, which often have rules regarding acceptable match prices. The tickets sold through Priceline.com, in fact, are distinguished from most normal tickets, in that they specify a departure and return date and city only, but do not allow specification of an airline carrier, flight number or time, or airport. Further, not only are these tickets non-refundable, but additionally the "bid" price is immediately charged to a credit card as a part of the "bid" acceptance process. The tickets of this special class are cleared through a CRS (Computerize Reservation System), and are assigned, by the airline that accepts the "bid", a specific flight. This system is apparently distinct from most auctions in that there is little attempt to efficiently establish a market price, since the process makes it difficult for the "bidder" to test the acceptance price point, and because the accepted price is not published. See, U.S. Pat. No. 5,897,620, Walker, et al., issued Apr. 27, 1999, expressly incorporated herein by reference in its entirety.

Strategic and operational planning for commercial airlines are highly complicated problems, especially since the industry has been deregulated. In order to cope with this complexity, computer-based decision support systems have been adopted to facilitate the planning of schedules, routes, aircraft and crew rotations and yield management. Airlines have thus developed Revenue Management Systems (RMS) (also known as yield management systems) to optimize their revenue per flight. Revenue management can be separated into two distinct parts: pricing and seat inventory control. Pricing involves the establishment of fare classes and tariffs within those classes for each flight. Seat inventory control is the periodic adjustment of available seats for the various fare classes so as to optimize the passenger mix and thereby maximize the generated revenue. In particular, the objective is to fly an aircraft as full as possible without allowing the earlier-booking (discount-fare) leisure passengers to displace the later-booking (full-fare) business passengers. Once a passenger books a ticket, the airline is required to place the passenger aboard the flight indicated on the ticket rather than aboard a different flight for the same itinerary, at risk of substantial penalty.

Revenue (or yield) management can be separated into two distinct parts: pricing and seat inventory control. Pricing involves the establishment of fare classes and tariffs within those classes for each specific origin-destination market. Seat inventory control is the periodic adjustment of nested booking limits for the various fare classes so as to optimize the passenger mix and thereby maximize the generated revenue. An airline's RMS typically knows well in advance, based on available historical data, that it will likely have empty seats on a given route or flight, with more seats empty at certain times of the day or days of the week. However, the RMS cannot simply discount the published fares for those seats without either starting a fare war or compromising its underlying fare structure (i.e., without also having to reduce its full-fare prices for business travelers).

U.S. Pat. No. 5,270,921, Hornick, issued Dec. 14, 1993, expressly incorporated herein by reference in its entirety, relates to virtual fare methods for a computerized airline seat inventory control system. An airline seat reservation system provides seat reservations controlled using, in part, a computerized seat inventory control system, based on Network-Based Expected Marginal Seat Revenue (EMSR), incorporating a probabilistic demand model without resorting to computationally intractable integer programming. The seat inventory control system uses iterative leg-based methods to control bookings in a flight network comprised of a plurality of itinerary/fare class combinations using a plurality of flight legs. When considering a particular flight leg, the total fare paid by a passenger using the leg is adjusted by taking into account an estimate of the displacement cost of the travel on the other legs of the itinerary to create a virtual fare. Expected marginal seat revenues (or more precisely, their current approximations) provide the displacement costs on the legs when computing virtual fares. Using these virtual fares, a leg-based optimization method is applied to the individual legs one-by-one to compute new approximations of the expected marginal seat revenues. This method is iterated until the expected marginal seat revenues converge to their network-optimal values. Thus, it is clear that optimization methods exist for pricing and segmenting classes of airline seats; however, unsold seats remain, indicating that these methods are sub optimal. These methods, however, do provide useful estimates that may be fine-tuned by other techniques or used as a starting point for further optimization.

Internet Auctions

On-line electronic auction systems which allow efficient sales of products and services are well known, for example, EBAY.COM, ONSALE.COM, UBID.COM, and the like. Inverse auctions that allow efficient purchases of product are also known, establishing a market price by competition between sellers. The Internet holds the promise of further improving efficiency of auctions by reducing transaction costs and freeing the "same time-same place" limitations of traditional auctions. This is especially appropriate where the goods may be adequately described by text or images, and thus a physical examination of the goods is not required prior to bidding.

In existing Internet systems, the technological focus has been in providing an auction system that, over the course of hours to days, allow a large number of simultaneous auctions, between a large number of bidders to occur. These systems must be scalable and have high transaction throughput, while assuring database consistency and overall system reliability. Even so, certain users may selectively exploit known technological limitations and artifacts of the auction system, including non-real time updating of bidding information, especially in the final stages of an auction.

Because of existing bandwidth and technological hurdles, Internet auctions are quite different from live auctions with respect to psychological factors. Live auctions are often monitored closely by bidders, who strategically make bids, based not only on the "value" of the goods, but also on an assessment of the competition, timing, psychology, and progress of the auction. It is for this reason that so-called proxy bidding, wherein the bidder creates a preprogrammed "strategy", usually limited to a maximum price, are disfavored. A maximum price proxy bidding system is somewhat inefficient, in that other bidders may test the proxy, seeking to increase the bid price, without actually intending to purchase, or contrarily, after testing the proxy, a bidder might give up, even below a price he might have been willing to pay. Thus, the proxy imposes inefficiency in the system that effectively increases the transaction cost.

In order to address a flurry of activity that often occurs at the end of an auction, an auction may be held open until no further bids are cleared for a period of time, even if advertised to end at a certain time. This is common to both live and automated auctions. However, this lack of determinism may upset coordinated schedules, thus impairing efficient business use of the auction system.

In order to facilitate management of bids and bidding, some of the Internet auction sites have provided non-Hypertext Markup Language (HTML) browser based software "applet" to track auctions. For example, ONSALE.COM has made available a Marimba Castanet® applet called Bidwatch to track auction progress for particular items or classes of items, and to facilitate bidding thereon. This system, however, lacks real-time performance under many circumstances, having a stated refresh period of 10 seconds, with a long latency for confirmation of a bid, due to constraints on software execution, quality of service in communications streams, and bid confirmation dialogue. Thus, it is possible to lose a bid even if an attempt was made prior to another bidder. The need to quickly enter the bid, at risk of being too late, makes the process potentially error prone.

Proxy bidding, as discussed above, is a known technique for overcoming the constraints of Internet communications and client processing limitations, since it bypasses the client and telecommunications links and may execute solely on the host system or local thereto. However, proxy bidding undermines some of the efficiencies gained by a live market.

U.S. Pat. No. 5,890,138 to Godin, et al. (Mar. 30, 1999), expressly incorporated herein by reference in its entirety, relates to an Internet auction system. The system implements a declining price auction process, removing a user from the auction process once an indication to purchase has been received. See, Rockoff, T. E., Groves, M.; "Design of an Internet-based System for Remote Dutch Auctions", Internet Research, v 5, n 4, pp. 10-16, MCB University Press, Jan. 1, 1995.

A known computer site for auctioning a product on-line comprises at least one web server computer designed for serving a host of computer browsers and providing the browsers with the capability to participate in various auctions, where each auction is of a single product, at a specified time, with a specified number of the product available for sale. The web server cooperates with a separate database computer, separated from the web server computer by a firewall. The database computer is accessible to the web computer server computer to allow selective retrieval of product information, which includes a product description, the quantity of the product to be auctioned, a start price of the product, and an image of the product. The web server computer displays, updated during an auction, the current price of the product, the quantity of the product remaining available for purchase and the measure of the time remaining in the auction. The current price is decreased in a predetermined manner during the auction. Each user is provided with an input instructing the system to purchase the product at a displayed current price, transmitting an identification and required financial authorization for the purchase of the product, which must be confirmed within a predetermined time. In the known system, a certain fall-out rate in the actual purchase confirmation may be assumed, and therefore some overselling allowed. Further, after a purchase is indicate, the user's screen is not updated, obscuring the ultimate lowest selling price from the user. However, if the user maintains a second browser, he can continue to monitor the auction to determine whether the product could have been purchased at a lower price, and if so, fail to confirm the committed purchase and purchase the same goods at a lower price while reserving the goods to avoid risk of loss. Thus, the system is flawed, and may fail to produce an efficient transaction or optimal price.

An Internet declining price auction system may provide the ability to track the price demand curve, providing valuable marketing information. For example, in trying to determine the response at different prices, companies normally have to conduct market surveys. In contrast, with a declining price auction, substantial information regarding price and demand is immediately known. The relationship between participating bidders and average purchasers can then be applied to provide a conventional price demand curve for the particular product.

U.S. Pat. No. 5,835,896, Fisher, et al., issued Nov. 10, 1998, expressly incorporated herein by reference in its entirety, provides method and system for processing and transmitting electronic auction information over the Internet, between a central transaction server system and remote bidder terminals. Those bids are recorded by the system and the bidders are updated with the current auction status information. When appropriate, the system closes the auction from further bidding and notifies the winning bidders and losers as to the auction outcome. The transaction server posts information from a database describing a lot available for purchase, receives a plurality of bids, stored in a bid database, in response to the information, and automatically categorizes the bids as successful or unsuccessful. Each bid is validated, and an electronic mail message is sent informing the bidder of the bid status. This system employs HTTP, and thus does not automatically update remote terminal screens, requiring the e-mail notification feature.

The auction rules may be flexible, for example including Dutch-type auctions, for example by implementing a price markdown feature with scheduled price adjustments, and English-type (progressive) auctions, with price increases corresponding to successively higher bids. In the Dutch type auction, the price markdown feature may be responsive to bidding activity over time, amount of bids received, and number of items bid for. Likewise, in the progressive auction, the award price may be dependent on the quantity desired, and typically implements a lowest successful bid price rule. Bids that are below a preset maximum posted selling price are maintained in reserve by the system. If a certain sales volume is not achieved in a specified period of time, the price is reduced to liquidate demand above the price point, with the new price becoming the posted price. On the other hand, if a certain sales volume is exceeded in a specified period of time, the system may automatically increase the price. These automatic price changes allow the seller to respond quickly to market conditions while keeping the price of the merchandise as high as possible, to the seller's benefit. A "Proxy Bidding" feature allows a bidder to place a bid for the maximum amount they are willing to pay, keeping this value a secret, displaying only the amount necessary to win the item up to the amount of the currently high bids or proxy bids of other bidders. This feature allows bidders to participate in the electronic auction without revealing to the other bidders the extent to which they are willing to increase their bids, while maintaining control of their maximum bid without closely monitoring the bidding. The feature assures proxy bidders the lowest possible price up to a specified maximum without requiring frequent inquiries as to the state of the bidding.

A "Floating Closing Time" feature may also be implemented whereby the auction for a particular item is automatically closed if no new bids are received within a predetermined time interval, assuming an increasing price auction. Bidders thus have an incentive to place bids expeditiously, rather than waiting until near the anticipated close of the auction.

U.S. Pat. No. 5,905,975, Ausubel, issued May 18, 1999, expressly incorporated herein by reference in its entirety, relates to computer implemented methods and apparatus for auctions. The proposed system provides intelligent systems for the auctioneer and for the user. The auctioneer's system contains information from a user system based on bid information entered by the user. With this information, the auctioneer's system determines whether the auction can be concluded or not and appropriate messages are transmitted. At any point in the auction, bidders are provided the opportunity to submit not only their current bids, but also to enter future bids, or bidding rules which may have the opportunity to become relevant at future times or prices, into the auction system's database. Participants may revise their executory bids, by entering updated bids. Thus, at one extreme, a bidder who wishes to economize on his time may choose to enter his entire set of bidding rules into the computerized system at the start of the auction, effectively treating this as a sealed-bid auction. At the opposite extreme, a bidder who wishes to closely participate in the auction may choose to constantly monitor the auction's progress and to submit all of his bids in real time. See also, U.S. patent application Ser. No. 08/582, 901 filed Jan. 4, 1996, which provides a method for auctioning multiple, identical objects and close substitutes.

SUMMARY OF THE INVENTION

The present invention provides an efficient means for conducting electronic commerce, and preferably market-based commerce, e.g., system which test the supply and demand sensitivity of participants in order to control price points or available inventory. Preferably, business-to-business and inter-commercial applications are segregated from consumer transactions, both in user interface, rules and underlying nature of the transaction.

In commercial circumstances, a delay of closing an auction for hours or days is intolerable, as decisions or contingency plans must generally be established immediately. Further, inefficiencies due to server or communications latency and database inconsistencies in the conduct of an auction would impair confidence in the system, and potentially reduce optimality. Thus, for commercial transactions, in order for an auction to be considered efficient, it must have a duration commensurate with the attention span of the participants, typically being opened and closed quickly, with a high degree of activity throughout the progress, much as during a live auction. Bid entry and updates of client systems are preferably instantaneous, requiring a "push" technology. Proxy bidding should support advanced decision-making and strategies, rather than merely a simple maximum price.

The present invention therefore provides an automated auction system which supports push technology for information updates, a large number of simultaneous transactions, and rapid decision-making and auction closure.

Further, another aspect of the present invention provides a system for efficient communication between a plurality of client systems and a central server, in which processing burden is essentially distributed to the client systems, thereby facilitating server transaction processing. These communications may, but need not be, commercially motivated.

In a preferred embodiment, a system consisting of a server or servers and a plurality of internetworked remote client systems engage in a declining price auction to liquidate quantities of perishable or replenished inventory. The transaction server transmits, as necessary, a context sensitive message defining an inventory status. Thus, in the case of an airline ticket auction, the transaction server preferably periodically transmits updates of inventory remaining to each relevant client system, for example a specific application program residing therein. Where the update information is voluminous, the information is preferably compressed to fit within a minimum number of packets. Each application program interacts with a local server, which, in turn, employs standard protocols to interact with one or more user interface systems. A user interface system, through the local server, controls the application program to transmit, as appropriate, an efficient message to the transaction server indicating a transaction or proposed transaction with respect to the inventory. A process local to each client system, either embedded within the user interface system or application program, preferably implements a set of rules. This rules processor ensures consistency of the data within the transmission with presumptions or rules, or filters information from the client system, thereby transferring a processing burden from the transaction server (or host) to the client system.

In order to assure system integrity, data error correction and/or detection, data encryption, and/or data (or rule) alteration detection processes may be employed, either on the server or host alone or in concert with the client system. The rule database on the client system may also be encrypted, or otherwise made tamper proof or tamper evident. Therefore, the information transmitted from the client system to the transaction server may include various aspects. Preferably, the information is represented in the minimum number of Internet Protocol (IP) packets, i.e., one. However, not all information within the packet need be compressed, nor need advanced features be implemented unless necessary.

It is noted that the communications system may be any accessible network; however, the public Internet is preferred for its open access and standardized protocols. Likewise, a packet switched network, such as the public Internet, is preferred over switched circuit networks for their ease of scalability. In order to overcome privacy and secrecy issues on the public Internet, a virtual private network (VPN) system may be implemented, in which network traffic is physically transmitted over unsecured channels, while logically a layer of encryption is applied to ensure privacy of communications between cooperating systems. Typically, VPN's are implemented between servers or routers, which in this case correspond to the central server and the local server.

In a preferred embodiment, a bid is represented in a single packet transmitted by the local server to the transaction server, including an identification of the bidder, time of bidding, airline route or flight pair (for one-way or round trip passage, respectively), identification of travelers (prime traveler and any companions), and consistency check information. The transaction server, upon receiving the packet, decodes the information and immediately seeks to confirm the bid, by checking available inventory to determine whether the packet was received in time. If there is available inventory, the bid is confirmed and a confirmation message, typically also a single packet, is sent from the transaction server to the local server. Contemporaneously, the information in the packet is checked for self-consistency and for compliance with rules. If the packet is found to have been tampered or otherwise inconsistent, the information may be forwarded to an automated or manual exception handler. Typically, the bidder's credit is preverified, and thus most credit information is already available and confirmed. Upon bidding, the bidder's account is then charged for the bid amount, which is then verified to ensure that, for example, the credit limit is not exceeded. This credit confirmation need not take place in real time, but since most credit information is preverified, the final verification may occur quickly, potentially allowing inventory to be replaced in the auction in the event of a failure of verification, even during a short auction.

For example, in a declining price auction, the price progression may be uniquely defined by the starting price, price increment rate, price increment, ending price, starting time, ending time, or other related variables, in the form of a set of rules. Therefore, a message may be transmitted by the client system, in accordance with the rules, which define merely a time of bidding, which will specify the price in accordance with the rules. However, armed with information specifying the algorithm or packet format, a user might surreptitiously alter the clock of the computer or the time-stamp of the packet. This, in turn, might otherwise result in an erroneous calculation of price, thereby reducing seller revenues.

A number of steps or precautions may be employed to prevent this occurrence. First, the client system, e.g., application program, may be synchronized with the transaction server (or a common external time reference) at a commencement of a communication session. Periodically, or even at random intervals, the systems may be resynchronized, with significant deviations reported as possible evidence of tainted transactions or system failure. Further, outside of the real-time transaction stream, the client system may communicate with the auction system (to the transaction server or a different server within the central system), verifying packets which have been sent, e.g., by retransmitting the intended content in a secure, but not necessarily real-time communications session. The client system, e.g., application program, may employ data encryption or forward error correction techniques, for example with public key-private key technologies and/or watermarks, to prevent or identify tampering with packet contents.

Since, in many instances, the conduct of the preferred auction is time dependent, it is important to synchronize the local server clock. However, this synchronization need not require network traffic with the transaction server. For example, the local server may be designed to automatically request time synchronization information from a trusted source, such as the U.S. Naval Observatory or other timesource accessible through the Internet. The local server may be updated as desired or necessary to assure an accurate timebase.

This, of course, raises another significant advantage of the present invention. Because the rules are implemented remotely from the server or host, the rules applied for each client system need not be identical, and indeed these rules need not be known or transmitted to the host. Rules, therefore, may define personal or private data. For example, certain users may be subjected to different discount rates, rebates, surcharges, quantity limitations, shipping/distribution issues, or the like. In fact, the information displayed to a user interface in a client system may be controlled by the rules. Another advantage of this distribution of intelligence is that the client system, may interact with the user in a language of choice, using a desired screen format, etc. Thus, the client system may be subjected to various display constraints or optimizations, for example embodying a typical Microsoft Windows 98/NT/2000 system, or a Windows CE personal digital assistant, or a wireless mobile device, e.g., employing wireless application protocol (WAP) or the like.

In some cases, the IP packets intended for the local server would be filtered by a firewall arrangement. In this case, it is possible to design the packets so that they appear to be standard HTML documents delivered through HTTP. This may require, for example, that the local applet send a request packet, the response to which is the update. In this case, the request packet may be spoofed or directed to a different destination, to avoid network congestion on the operative transaction server.

In other instances, the client system architecture is inappropriate for hosting the local server and application. In this case, the local server or application may be physically remote from the user interface system. This may be the case, for example, with so-called net computers. Preferably, the local server is hosted separately from the transaction server, again to avoid generating the kinds of network traffic from the user interface that the local server is designed to prevent. Of course, collocation or integration of the local server and transaction server may result in increased latencies for such user interface systems.

Since the auction need not be identical for each participant, it is also possible to distinguish classes of bidders by allocations of inventory. This allocation may be defined by the transaction server or by the local rules. Thus, a consumer bidder may be presented with a block of inventory, while resellers are presented with a larger block of inventory. Since the consumer bidders will see a declining amount of available inventory, they will be forced to bid, if at all, prior to resellers. However, if the reseller requires a large quantity, or seeks to inflate the retail market price for the subject of the auction, he may also participate in bidding on the earlier inventory. The allocations need not be published, and in fact may be different for various tiers of reseller. Thus, multiple simultaneous private auctions may be conducted within the same schema, and potentially competing for the same or overlapping inventory. Distinct pricing (e.g., discount rate, credit rules, surcharges, etc.), allocation, restrictions on resale, or other rules may be applied to protect a distribution channel.

The rules may also be adaptive, either based on interactions with the user, based on the context of use, or both. See, U.S. Pat. Nos. 5,920,477; 5,903,454; 5,901,246; 5,875,108; 5,867,386; and 5,774,357, expressly incorporated herein by reference.

In the event of adaptive rules, it is preferred that critical rules common to a plurality of bidders be adaptive to the same elements. Thus, the rules cached locally include a common set of adaptive factors, so that the normal communications from the transaction server adapt the client systems, and the transaction server (or other logical element associated with the central system) can predict the particular state of the local rules for each client system, thereby allowing an interpreting a transaction packet from the client system, in the event that the packet cannot be interpreted without reference to this information. The rule pattern, as discussed above, may be uniform (and therefore a priori known to the host) or private and secret. However, it is also possible to also provide an identification code for each rule, and transmit the code from the client system to the transaction server with transaction information. In similar form, the client system may encompass a large set of rules, some of which are applied to any given transaction. These rules may be applied in context sensitive manner, i.e., based on the applicability of the rule to the situation, either determined implicitly by the client system or by explicit control or selection by the user. The particular rules applied may then be identified to the transaction server.

A preferred adaptive progression scheme provides that, as buyers take inventory, the amount of the price reduction becomes smaller. The auction duration and price decrement interval remain constant.

The rules need not relate to essentials of the conduct of the auction, but may also relate to ancillary issues, such as ticket delivery options. Thus, where there is sufficient time between the auction and departure, mail delivery may be acceptable. On the other hand, with insufficient lead-time, overnight delivery may be the only option. Such rules may be readily implemented in the local server, thereby minimizing network traffic between the local server and transaction server, and potentially allowing customization of rules, such as hand pickup or messenger where such is appropriate, without making such options generally available.

Another example of a rule, which may differ between respective bidders, involves frequent flyer miles. Thus, for example, a carrier may define a relationship between frequent flyer miles and cash bids, storing a balance on the client system local database, e.g., within a database associated with the application program. The bidder may then bid these frequent flyer miles for passage. The carrier may, for example, apply different valuations for different routes, or apply different restrictions for frequent flyer purchases than for cash (or credit) purchases. Hybrid purchases and upgrades may also be permitted. Differing priorities may also be associated with various bids; for example, a confirmation message may be delayed to any client system until a set of bids is received. Bids sharing common parameters or within a common time window are then sorted, with the highest prioritized bids being confirmed and the remainder being non-confirmed. Thus, for example, a rule may be implemented at the transaction server to prevent frequent flyer mile-funded purchases from displacing cash purchases, all other parameters being equal; on the other hand, customer loyalty may also be rewarded by prioritization within the system.

Thus, it is seen that a number of options are available for managing the intelligence and rules at the client systems, without imposing a large communications burden.

In a preferred embodiment, the architecture encompasses both the client (e.g., client system) and server (e.g., transaction server), as discussed above, and a separate user interface presentation system associated with the client. The user interface may reside within the same processor complex as the client, or be physically separated. Typically, this separation is by way of a high bandwidth link, such as a local area network. The user interface may be, for example, an applet or HTML/ XML document viewed by an appropriate browser, with or without a plug-in application. It is also possible to employ elements of Synchronized Multimedia Integration Language (SMIL) (Boston Specification, W3C Working Draft 3 Aug. 1999, http://www.w3.org/1999/08/WD-smil-boston-19990803/); See also http://www.w3.org/TR/smil-boston, which may evolve as standard extensions to browser functionality, to handle certain real-time-related tasks. The client system preferably communicates with the transaction server using the Internet (IP) protocol, although not employing hypertext markup language (HTML) protocol or extensible markup language (XML) protocol, in order to provide efficient machine-to-machine communications. Preferably, the client system is organized to have an application program executing which controls this aspect of the communications, and which may implement a virtual private network-type system. The application program is preferably linked to the local server through a set of application programming interfaces (APIs), to allow a relatively tight coupling. On the other hand, the client system preferably employs a standard protocol for communicating between the local server and the user interface system component, for example using IP sockets, and therefore allows communications through TCP/IP protocol, and use of a standard browser or Internet applications. It is noted that communications between the user interface system and local server need not be compressed or highly efficient. The application program of the client system typically implements the rules, especially where a standard browser is employed to provide the user interface. Alternately, the rules may be implemented in an applet or browser plug-in application. For example, a JAVA applet may be provided on a user's machine to generate and display the user interface, e.g., employing a JAVA virtual machine (JVM).

In the case of an airline ticket system, a database is maintained of ticket and route information, as well as a set of rules, such as available round-trip pairs, stopover requirements, and temporal parameters relating pricing changes. Preferably, the ticket and route information database is implemented in the local server system, although it is also possible to implement this in either the applet or a remote server. In the case of a remote server, it is preferred that the server be distinct from the transaction-processing server, in order to reduce load on the transaction server.

In a preferred embodiment, a user, through a loader application, invokes a local server application, which then initiates a communications session with a remote system. In an initial communication, the local server communicates with the central server system to determine whether it requires updating. If it does not include the most updated information required, it is updated, including program code, applets, and database information, as necessary. The clock of the local server is also synchronized prior to an auction. Thereafter, an HTML page opens in a standard browser, typically buffered locally. The user then interacts with the HTML page, which may further reference local or remote resources in standard manner. When the user seeks to invoke an auction or other applet based system, a universal resource locator (URL) directs the user machine to load and invoke an applet. This applet then communicates directly through an IP stack in the user's machine with the local server, which then engages in a "dialog", in which the user interface applet receives necessary information from the local server for display.

A degree of intelligence, represented by a set of rules, is implemented in the local server, which, based on previously stored information and selected choices by the user, ensures that subsequent selections of options and choices by the user are consistent with prior selections and choices, and all abide by the set of rules. For example, if a prior airline reservation encompasses a block of time between departure and return, no additional tickets can be purchased within this time-period. Of course, further intelligence may be applied, for example looking at the presumed location of the traveler to allow a complex itinerary while preventing inconsistent travel reservations.

When the user is ready to complete a transaction, for example by accepting the then-displayed price for an available quantity of tickets, only then is communication required to transmit a packet from the local server to the transaction server. The local server communicates a minimum amount of information to the transaction server, including the identity of the bidder, route(s) being bid on, the bid parameters, e.g., time of bid in a descending price auction, and possibly other information and error detection codes. Typically, the transaction server immediately responds with a confirmation of the proposed transaction, which may be accepted or denied, for example if no remaining inventory remains or the packet including proposed transaction information fails a consistency check to ensue integrity. If confirmed, the transaction is completed at the transaction server, and the confirmation logged on the local server, forming a part of the database of past selections and choices for the application of rules. If not confirmed, the proposed transaction may be nulled, or otherwise processed by the local server. For example, an alternate itinerary may be presented for bidding.

In the case of an end-traveler auction, the transaction processing typically includes charging a credit card for the tickets. If the credit card transaction fails, the transaction may be "unconfirmed", thus returning the tickets to the airline inventory. Preferably, the "unconfirmation" process updates the local server to allow the user to later participate in auctions that would have been blocked by the confirmation. Alternately, the custom rules for each client system are uploaded each time the system is resynchronized. This technique, therefore allows the user to maintain consistency while employing multiple terminals, e.g., home, office, etc.

According to another embodiment of the invention, a system for airline ticket aggregator use is provided. In this case, consistency rules and other end-user specific rules are not applied in the same way. Further, in contrast to end-traveler auctions, tickets are generally sold for one-way passage, rather than round trip, allowing the aggregator to pair trips. In the case of aggregators, however, the system may implement rules relating to, for example, available credit limit. Thus, an aggregator may only be permitted $100,000.00 of outstanding tickets at any time. The local server therefore accumulates total dollar volume of tickets sold, warning the aggregator as he approaches the limit. In the event of aggregator firms, the local server feeds data to a plurality of client machines, allowing consistency across a plurality of users.

In the event of proxy bids, the rules implemented on the proxy system are preferably synchronized with the local server, either during the auction, if the local server is on-line, or during next sign-on, if the local server is unavailable.

In establishing a declining price auction for airline tickets, the auction starting price may be, for example, the published price for a comparable ticket. Based on a synchronized clock, the price declines over time. In a preferred embodiment, the price declines by linear increments, over a fixed period of time, to a predetermined minimum price. Each prospective buyer submits a bid at the value assigned by that buyer, as the price reaches the desired level. A buyer may assign a value to the tickets based on remaining inventory, seeking to submit a bid as the inventory declines to the minimum number of tickets required. The buyer may also base his strategy on the nature of the goods, price, and bidding tempo. Of course, if each buyer seeks to wait until the last possible moment, then the bids will all be clustered, increasing the risk of waiting. Alternately, a proxy bidder is programmed, preferably including a price vs. remaining quantity function, with an increasing strike price as remaining quantity is lowered. The auction runs for a predetermined period, e.g., four minutes.

The remaining available quantity may be hidden or visible to the bidder. If it is visible, it may be represented numerically or graphically, such as with a bar graph. If not visible, the bidder is informed, for example, only that inventory remains. In this later case, the client system need only be updated for inventory status when non remains. Where the auction seeks to sell a matched pair of airline tickets, for example, a bar graph may be employed to show remaining quantity of both departure and return flights. Thus, the bidder may be afforded the option to alter one leg of the trip where there is a disparity in remaining quantity. Thus, if inventory of seats for one leg of a trip is exhausted, the bidder may seek an alternate flight, rather than be forced to bid for the scarce resource and the abundant resource together.

Buyers with a large demand may test the market by buying small quantities of inventory as the price declines, since this will have little effect on the average inventory cost. Buyers with low risk tolerance (i.e., the risk of coming away from the auction with insufficient inventory for its own business needs) will also bid early. When the quantity remaining equals the quantity desired by a bidder, that bidder would normally seek to acquire the remaining inventory. In fact, since competing bidders presumably desire multi-unit blocks, it would be a high-risk strategy to wait until the minimum quantity desired remains, since the quantity could quickly increment below the minimum size block desired. Further, in this setting, bidders with an appetite for large blocks would tend to bid higher than those with a demand for a lower quantity. This aspect of the declining price auction is somewhat different from an ascending price auction, in which those with a demand for lower quantities tend to preferentially win with respect to those with similar private values but demand for larger quantities.

In a business-to-consumer auction, the buyer is the traveler, with no intent to resell. In this case, the auction is intended, not so much to establish a market price and move large quantities of inventory, but rather to efficiently fill seats (at the highest possible price) that might otherwise remain unsold. In this case, typically, individual consumers will have a demand for a relatively few seats. Thus, such consumers will be unlikely to test the auction, as any "early" bid will clearly increase the costs. The highest price corresponding to the bidder's maximum utility will therefore be suppressed. On the other hand, when the price reaches what a group of bidders perceives as the appropriate price, an avalanche effect will occur, with a potentially rapid clearance of the market close to that price, resulting in an efficient auction result.

The present invention provides a feature that allows a user to program in a demand curve before the auction, which may be potentially overridden by the bidder during the auction. The mere existence of preprogrammed or proxy bidders forces even the live bidders to plan and analyze their private value and demand curve prior to the auction. This, in turn, will generally promote higher initial bid prices, since a preprogrammed proxy bidder will not hesitate.

According to a preferred embodiment, airline tickets are auctioned during a series of relatively short auctions with scheduled duration. This allows participants to monitor an auction continuously from beginning to end, and to strategically place bids to optimize the price paid and the risk of losing the bid.

The display interface of the user system is preferably updated in real time, with very short latency between the entry of a bid by one bidder and updating of screens of all other bidders. Bids are also entered in real time, meaning that there is no substantial latency between the volitional act by a bidder in placing the bid and the transmission of a packet to the server. This is due, in part, to the implementation of rules as soon as applicable, avoiding ancillary decision-making at the time of entry of the bid. Further, since a race condition, i.e., competing inconsistent conditions, is possible, verification also comes immediately to the bidder by return packet.

Typically, a number of auctions are conducted simultaneously. In this case, the packets from the transaction server include update information for all auctions selected as being monitored by the client systems, then in progress, in a compressed format, further increasing efficiency. These aggregate packets are received by the local server and passed to the applets associated with user interface system(s) for display, based on the particular auction being monitors.

In order to assure scalability, a preferred embodiment of the invention employs a multiprocessing hardware implementation, for example an Internet server comprising six Pentium III Xeon dual-processor systems interconnected with a 100 Base T network, with a separate database server, e.g., an IBM RS-6000 server, with a redundant array of inexpensive disks (RAID) storing the data. One of the processor nodes coordinates the auction, while the remaining nodes are symmetric and are balanced handle the auction process. Thus, each IP packet from a bidder is received by one of the Internet server processor nodes, and is processed. Likewise, the Internet server updates each bidder with auction information in real time. Upon closing of a transaction, e.g., purchase of an airline ticket, the database server opens (or creates) an appropriate database record, and updates the relevant portions of the database. The bidder account is then charged, for example through a credit card. Upon clearance of the transaction, the airline host computer is updated with the indication of the ticket sale. Generally, the airline inventory subject to auction is reserved in the auction system, and is thus not available for sale through other channels for the duration of the auction, which is generally a few minutes. It is also possible, however, to update the auction process from the airline host system, at the penalty of potentially increased latencies.

The local server may serve a number of different user interface systems and users. Therefore, the path between the transaction server and local server is akin to a virtual private network bridge, which efficiently transports packets between sub-networks. Using this architecture, the client system is not limited to a particular platform. Thus, assuming that the client system applet is written in JAVA, any system that supports JAVA applets may be used as the client hardware.

Therefore, by providing an efficient proprietary packet format, rather than the relatively inefficient HTML protocol designed primarily to present human readable text pages through a standard browser, near real-time performance can essentially be maintained even in the absence of guaranteed Internet "quality of service". This is principally because the data is compressed into a minimum number of packets, and because the server need only broadcast a small number of packets, e.g., one per local server, while servicing a large number of client systems. In principal, a number of intermediates or proxy servers may be interposed between the transaction server and client systems, potentially offloading certain processes from the primary transaction server while only slightly increasing the minimum packet delivery latency and reducing the average packet delivery latency.

Architecturally, the system therefore consists of a transaction server, which manages inventory and bidding, which cooperates with an internal or external proxy bidding application. For example, the proxy bidding application may be situated as a set of virtual clients within a local area network including the transaction server, producing bids at appropriate times. The transaction server is tightly integrated with an Internet server, which implements a virtual private network, linking to a plurality of client systems. Each client system communicates with authorized bidders at user interface systems thereof. The client system typically incorporates a user interface system, which may be a standard-type browser with support for JAVA applets, a local server, communicating with the user interface system and applets, and an application program, coupled to the local server using a set of application programming interfaces (APIs) to provide local intelligence. The local server supports standard IP socket protocols, and may support a large number of user interface systems on the same local network. The application program communicates with the transaction server employing IP communications as well. The application program may directly communicate with the transaction server, or communicate through the local server.

It is noted that, in many instances, the user interface system, the local server and the application program will all reside on a single personal computer. In this case, the personal computer operating system employs a single TCP/IP stack. Thus, the user interface communicates with the local server through the TCP/IP stack, and the personal computer conducts all Internet communications through a single TCP/IP stack, e.g., WINSOCK.DLL. The application program therefore may be an applet that communicates exclusively through the local server or potentially directly with the TCP/IP stack.

According to a preferred embodiment of the invention, the traditional Dutch auction format (declining price auction with linearly decrementing price and lowest successful bid pricing) is modified somewhat, for the sale of, for example, airline seat inventory. Each auction is preferably timed, to provide a predefined schedule, although an adaptive progression scheme could be implemented based on bidder activity levels or the like. In this case, a clock starts the auction, and the lot up for auction would consist of a block of airline seats, for example 20 to 50 seats. As time elapses, the offering price drops at regular intervals, e.g., about $10 every 15 seconds. Again, the price drops may occur according to other formulas, such as an exponential decline, or by an adaptive scheme based on remaining inventory, bidder activity, and time remaining (if a fixed period auction). In fact, according to an adaptive scheme, pricing can actually increase based on high demand conditions, in a generally decreasing price auction.

It is also noted that the auction system may withdraw available inventory automatically as the price declines, or add inventory to meet demand at an advantageous price. Thus, the auctions rules may be quite sophisticated, based on local adaptive algorithms and sparse data transmitted from the central transaction server.

In the auction, a bidder can opt to buy a preset number of seats at a price that is acceptable to him. As the price changes, additional bidders can purchase the remaining inventory as long as there is inventory left or until the clock reaches zero, ending the auction. Preferably, auctions maintain their starting and ending times, in order to maintain a schedule; however, even this constraint is subject to relaxation.

Each successful bidder receives the requested number of seats, at the price being offered when he elected to buy. Alternately, the price may be based on the lowest successful bid price, although this may produce lower profits for the auction. Such a strategy may be modified by allowing the supplier to withdraw remaining inventory at any time, ending the auction.

In a practical example without adaptive features, an airline seeks to sell tickets on a certain route. If the opening price is $500.00, and the lowest acceptable price is $200.00, the difference is $300.00. If the total auction time were set for 4 minutes and updated every 20 seconds, there would be 12 equal increments. In that case, the price would drop 300/12 or $25.00 every 20 seconds. If the update rate is set to 15 seconds, there would be 16 equal increments and the price would then drop by $18.75 every 15 seconds.

All three variables—opening price, lowest acceptable price and update rate are independently adjustable, providing for an optimum linearly declining price rate. Also, with this concept it is possible to run simultaneous auctions of distinct inventory with differing opening and lowest acceptable prices; of course, resulting in varying declining prices. The length of the auction and the update rate are the only two elements that would remain constant. This simplifies inter-process communication, but is not a necessary feature of the system according to the present invention.

Preferably, the auction schedule is predetermined, allowing a user to determine within a short period whether he or she will be the successful bidder. Thus, for example, auctions run for a period of four minutes with a one-minute pause in between auctions. This allows for 12 auctions per hour on a preset schedule. The entire set of auctions may be periodically repeated, for example daily or consecutively, with remaining inventory from prior auctions and/or with replenished inventory released over time. The order of the auctions may be set to maximize profits, such as by predicting parasitic demand factors and ordering to achieve highest auction pricing, based on a previously obtained knowledge base. In fact, it is believed that convenience in the purchasing process may be a substantial factor, and therefore a buyer might be willing to pay relatively higher prices for tickets (as compared with other deep discount alternatives) so long as they are available and closure of the transaction assured within a short period.

Airline auctions according to the present invention preferably provide simultaneous auction of all gateway cities (city of original departure), organized by city-pairs. An auction consists of all flights originating from a particular gateway city-pair covering a date range of one week. For example, a gateway city-pair is New York (JFK) to London Heathrow (LHR). The date range is, for example, February 20-26. This auction organization is premised on the use of the auction by or for individuals, since an individual is unlikely to be making flights outside a city pair more than once a week, it is unlikely that that person would need to be involved in more than one auction simultaneously. In the event that this is not the case, the bidder may employ proxy bidding or simultaneously monitor and bid on a plurality of auctions.

This organization may also be useful for aggregators, those who seek to purchase blocks of airline seats for resale to others, and who can bid based on anticipated needs for any week and city pair.

In one type of system, where it is presumed that all demand will not be liquidated during a single auction, each date range from a particular city-pair may be repeated once per hour until its inventory is exhausted. Given this organization, if no inventory has been allocated by the airline for a specific gateway, flight or departure date, no selections will appear in the auction screen.

In like manner, multiple airlines may provide inventory within the same auction. Therefore, the bidder may have not only the choice of gateway city, date and flight, but also carrier.

In fact, while a multi-carrier auction would on one hand provide competition within a single auction for sales, it would also provide great incentive for all representative bidders to participate in the auction. Therefore, a single channel would be established without parasitic competition for the system. This, in turn, would more reliably establish a market price, and therefore reduce the bidder's and seller's risk that the auction market is not representative. This reduction in risk equates to greater efficiency, and may yield greater optimality. In order to implement a multi-carrier auction, the respective products or services from the various sellers must be commoditized. This commoditization may be by the sellers or auctioneer, who in this case represents multiple competitors, or through a pre-auction analysis by each bidder. For example, a bidder may apply rules to slightly different valued inventory, such as a discount rate, to allow them to be grouped together without distinction. The auctioneer, however, must assure that comparable inventory is auctioned simultaneously. Once the goods are commoditized, and grouped together, at least at the user level, the auction commences. The bidder places a bid, which is then translated, through the rules applied at the client system or the transaction server, into a particular bid for particular goods. Since, in a preferred embodiment, a declining price auction is implemented, a bid is essentially an irrevocable offer to purchase, which must be immediately confirmed by the auction system. In this case, the auction system, in conjunction with the client system, resolve any ambiguity in the bid, and provide confirmation to the bidder. In some cases, the auction system may apply higher order intelligence to matching the bid price to the goods being auctioned. In this case, after resolution of ambiguity, the bidder may be permitted to reconfirm the specific transaction.

Upon confirmation (or reconfirmation), the transaction server then immediately communicates with the respective seller, typically by a dedicated communications channel. In the event of airline tickets, typically a leased line arrangement is implemented, although virtual private networks, frame relay, dial-up integrated services digital network (ISDN), digital subscriber line (DSL), or the like may also be used. Standard Internet communications are disfavored because of the potential for delay or lost packets. In the event that a confirmation is not available from the initial intended supplier, if the implementing rules permit, the transaction server may attempt to confirm for an equivalent alternative. If all sources fail to confirm, the bidder does not receive confirmation, and may further participate in the auction for other inventory. If the bid is confirmed, the auction rules may require that the bidder be removed from the auction, or that further restrictions be placed on inconsistent bids. In any case, the bidder is preferably informed by return information packet that the bid was successful or unsuccessful. In contrast to typical auction systems, the multicarrier auction system described herein resolves one carrier from a plurality, and communicates transaction information therewith.

In order to provide a fair forum for all carriers, the inventory may be liquidated in random or round robin fashion. Further, the airlines may in essence conduct a reverse auction to prioritize the liquidation of inventory. Some airlines would seek to reduce risk of unfilled seats, and therefore risk low pricing. Other airlines would seek to maximize pricing and therefore risk unsold inventory. It is therefore evident that a simple declining price auction would be ineffective, since this process requires liquidation of higher priced inventory before lower priced inventory. It is apparent that, if carriers place different economic parameters on respective inventory, these may not be commoditized together by the auctioneer, and that, since some buyers accept the higher price inventory over known lower priced inventory, that bidders distinguish the value of this inventory. This process may be addressed by allowing the bidder to apply an equalization function to value the respective inventory together. Thus, services of a major carrier may be considered worth 25% more than services of a limited carrier. Once this valuation is applied as a rule, two simultaneous auctions for the respective carriers may be merged, on the bidder's user interface, into a consolidated equalized auction. The bidder may be aware or unaware of the carrier whose inventory is being bid on, and thus the actual price being bid. At each time point, therefore, inventory of multiple carriers may be represented, if within the calculated pricing parameters. While carriers may a priori determine auction parameters, placement in the auction may also be determined in a competitive process. In this case, carriers disclose proposed pricing schemes, and seek, through competitive processes, to best conform the pricing to their respective economic models. In order to avoid antitrust considerations of direct collusion in pricing, the communications may be made through an impartial forum, such as the auctioneer.

The present system may also be used to provide other services to travelers. For example, the registration and bidding by a traveler provides substantial and valuable information to the auctioneer. Even if the bidder is unsuccessful, he may be offered ancillary services for the corresponding trip, including hotel, car rental, concierge services, show and event tickets, etc. Targeted banner ads may also be directed to the user, especially in non-time sensitive communications periods. The local server may also present advertising information to the user from a local cache, thus reducing telecommunications system load while directing relevant information to the user. These ads may be presented through the user interface applet or the browser system. Thus, a database may be maintained of travel plans, for uses outside of the auction process itself.

The auction system need not be limited to airline tickets. For example, commodities, such as oil and gas, are routinely auctioned. The present system also allows services and intangible rights to be auctioned. Thus, for example, telecommunications carriers may auction short-term capacity, or guaranteed quality of service commitments, based on projected available short-term capacity. This allows such commodities or services to be sold at a market price, without requiring a prediction by the seller of an appropriate fixed price to maximize profits. Further, once a bidder chooses to participate, it is likely that he will bid, unless quantity is extinguished prior to reaching his utility price; thus, there is likely to be fewer "window shoppers".

The local server/transaction server architecture according to the present invention need not be dedicated to any specific type of inventory to be liquidated, and thus may be provided as a service to various sellers of various products or services. As stated above, the system need not be limited to a single vendor, and may thus encompass a global market. Further, in an adaptive scheme, a continuous auction may be implemented, continuously setting a market price and liquidating inventory at that price, rather than in a fixed price auction. Of course, a continuous auction generally requires a very large or regenerating inventory and sufficient trade volume to ensure true market valuation. Thus, telecommunications services are a good example of a "commodity" which may be continuously auctioned.

In addition, the transactions processed need not represent auction purchases. For example, inverse auctions, or offers for sale, may be communicated and resolved through the present system. A market system may also be implemented within a corporate Intranet, to redeploy corporate resources. In this case, cooperative bidders may use the process to allocate resources to the most highly valued user. Often, a common currency is required, such as budget dollars, but a barter system may also be implemented. Likewise, a human decision-maker may also determine the value of a bid or available "credit" for a bidder, in order to confirm a bid.

In some instances, it is considered important to shield price information from casual observers, and to shield bid prices between competitors. In an Internet auction, bids and proxy bids may be maintained in confidence. Further, a registration process may be employed to prevent casual review. Finally, by employing an applet-based user interface with a proprietary data format, it would be difficult for a bidder to download or print the history of an auction, for future analysis. In fact, according to the present invention, the auction system has the ability to alter the fundamentals of the auction during its conduct, for example by lowering or raising prices, increasing or withdrawing inventory, or altering the time course. These alterations (or even their potential) may impose noise on the bid information received by any one bidder such that analysis of the presented data would be futile.

BRIEF DESCRIPTION OF THE DRAWINGS

The preferred embodiments will now be described with reference to the drawings, in which the same features of the drawing is represented with the same reference numerals:

FIG. 3 shows an auction route selection screen;
FIG. 4 shows an auction bidding screen;
FIG. 6 shows a proxy bidding screen;
FIG. 7 shows a purchase confirmation screen;
FIG. 9 details an adaptive algorithm according to the present invention for determining an auction price, based on starting price, ending price, time and time increment, seats originally available, and seats sold.

DETAILED DESCRIPTION OF THE PREFERRED EMBODIMENTS

Figure 1:
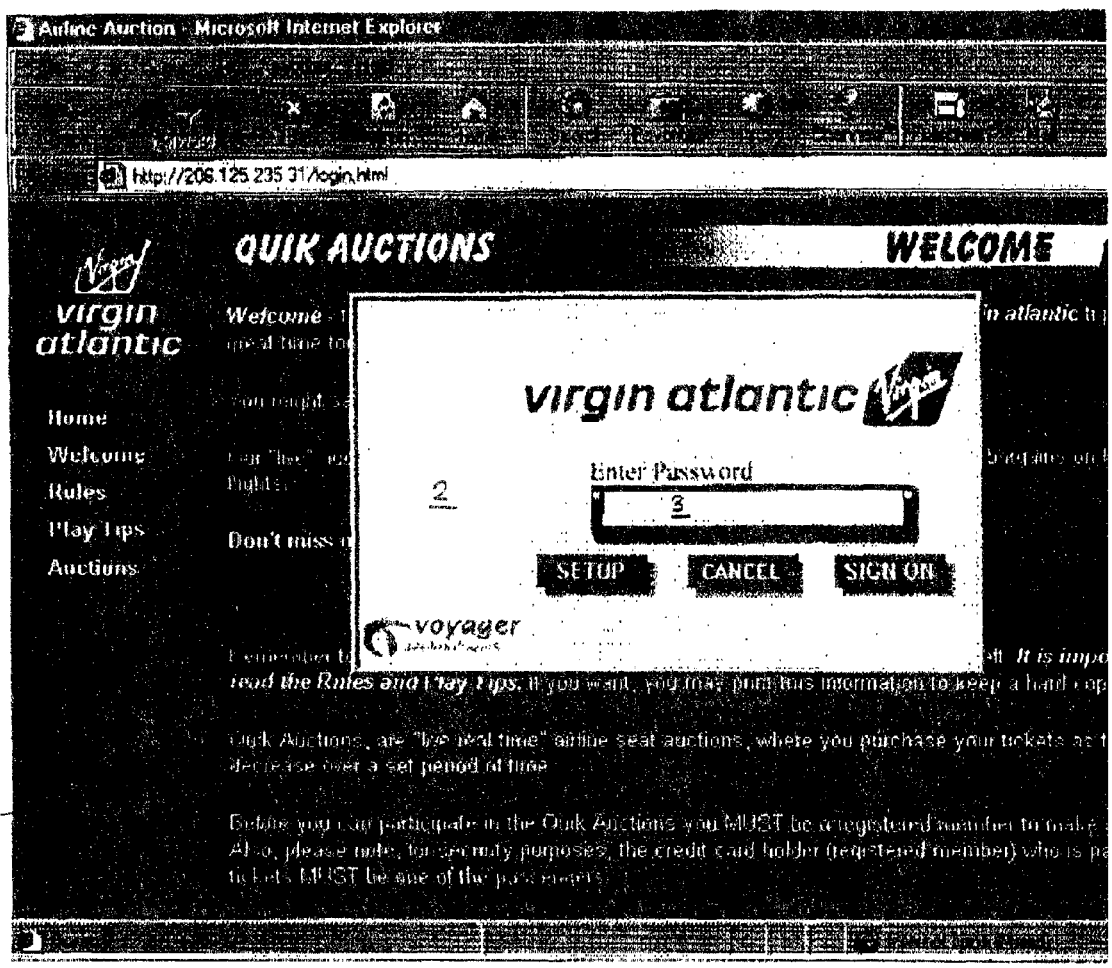
FIG. 1 shows a sign-on display screen.

According to a preferred embodiment, an airline ticket declining price auction is implemented. The system preferably allows multiple bidders to communicate with an auction system through the Internet and provide real-time bidding and responses.

According to the present invention, to participate in an auction, the prospective bidder must obtain the application and local server software, for example, by downloading the application from an FTP server 114, a "loader" disk or CD-ROM. Access to this application may be restricted, and thus the system may be private or exclusive, or publicly accessible. Typically, the bidder will execute the loader program provided to him on a CD-ROM, which launches the bidder's internet browser and then automatically downloads or copies the application to the bidder's local machine or client system 100. This architecture enables all the graphic images or HTML pages to be stored locally and not have to be downloaded each time the bidder accesses the auction application. The flight schedule is stored locally in a database. Once launched, the application software program 104 will thus automatically download any updated auction files, e.g., program updates, flight schedule database updates, rule updates, bidder record updates, etc., from a remote auction system server 110, ensure that the bidder is properly registered, and allow a registered and qualified bidder to join in the auction process. Upon initial use, a database file 106 is updated on the client system 100 with identifying information.

The registration form includes the bidders credit card information, including billing address, telephone numbers and email address. This form also provides for a default list of travel companions 12. For example, family members or business associates. Once completed, this information is then submitted to the auction system 110 for validation of the credit card data through the credit card verification system 117. An auction activation key is, for example, sent to the bidder via his previously provided email address, for entry as an initial password 3.

In the preferred embodiment, after the application has been downloaded, it creates a desktop icon under Windows a 95/98/NT/2000 system, which is displayed on the bidder's computer desktop. To launch the set of auction system applications, the bidder may simply double-click on the auction icon, which launches the local server 101 and application software program 104, which in turn opens an HTML page, causing the operating system to launch the default Internet browser 102. If necessary, a dial-up connection to the Internet 105 is also initiated.

The bidder is thus initially presented with a login screen 2, as shown in FIG. 1. The login screen 2 requests a user password 3, without which access is denied. The auction application is accessed through an Internet browser, which displays an HTML screen 1.

Once logged in, a bidder may participate in an auction in several ways: in a single auction (one city-pair); in multiple auctions (more than one city-pair); and via a proxy bidder 113.

To accommodate as many bidders as possible, the amount of data interchange between client system 100 and auction system 110 is preferably held to a minimum, especially while an auction is in progress. The local server 101 typically acts as a "server" only to the browser application 102, by accepting connections from the browser 102 and providing HTML documents. The browser 102 requests can also trigger the application software 104 to perform dialogs through application or applet screens with the user, unrelated to the browser 102, for example the log-in screen 2. The application software 104 also acts as a "client", making connections through the Internet 105 to the remote HTTP server 119 and other resources through the remote socket server 112, when necessary, for purposes of providing and receiving updated information, such as, current inventory status, and synchronization of the auction clock 20. In an alternate embodiment, the local server 101 and local application software 104 may reside on a computer physically separate from the client system 100, and, for example, communicate with multiple browsers 102 through a local area network. Although significant bandwidth is required at the transaction server 111 for handling the bidding through potentially hundreds or thousands of client systems 100, the required bandwidth is not as intensive as would be required for continuously updating prospective buyers with seat inventory status and directly communicating with Internet browsers.

The information that resides in the database 106 on the client system 100 prior to the auction is typically pseudo-static information, such as, flights being offered for auction (flight number and date), opening price, and lowest acceptable price. These variables are located in tables, from which all other parameters are calculated. These parameters include, but are not limited to, auction number, declining price intervals, and departing city. Thus, the information required to be transmitted from the transaction server 111 during an auction is minimized.

When an auction starts, the local server 101 associated with the client system 100 requests a socket session from the socket server 112, which may, for example be limited to processing transactions for a particular departure city that bidder wants to bid on. That particular action ensures that the application software 104 program version on the client system 100 is the most current (and if not downloads an update), synchronizes the auction clock 20 on the client system 100, and downloads the seat inventory 43 for his desired selections. This socket session of the socket server 112 remains open until the auction ends or when the client system 100 quits. The transaction server 111 uses the socket session to update, on request, all bidders for the respective departure city with seat inventory status 43. In the process of buying inventory, the client systems 100 submit purchase requests, through the HTTP server 119, which may or may not be successful. When a purchase is made, the successful bidder is dropped from the current auction. The central database server 115 is then updated, which in turn updates the respective airline host yield management system 118, through the PNR processor 116 and returns the confirmation of the purchase with a recap of the itinerary to the bidder's computer. (See FIG. 7).

The PNR processor 116 is connected directly to the airline's host system 118, which allows it to access and manipulate specially designated inventory for auction purposes. The database server 115, in turn, updates all the other elements of the auction. This is preferably a completely automated process, requiring no manual intervention. In a process that may occur simultaneously or delayed, the accounting information of the bidder is updated. For example, a credit card charge is initiated. If this is not confirmed, the inventory is returned for reuse by the airline host yield management system 118.

As transactions are completed, the database server 115 of the auction system 110 provides data to one or more automated PNR processors 116, in order build Passenger Name Records (PNR) in the airline's host system 118. The credit card approvals are obtained through a credit card verification system 117; otherwise, a PNR will not be created and the seat inventory will be returned for later auctions. While all credit cards are preferably qualified prior to the bidding process, a purchase may nevertheless fail to confirm for a variety of reasons, such as insufficient credit limit. The auction system 110 may manage a set of rules for disqualifying bidders (or particular forms of payment), e.g., in the event of unresolved payment issues.

Figure 8:
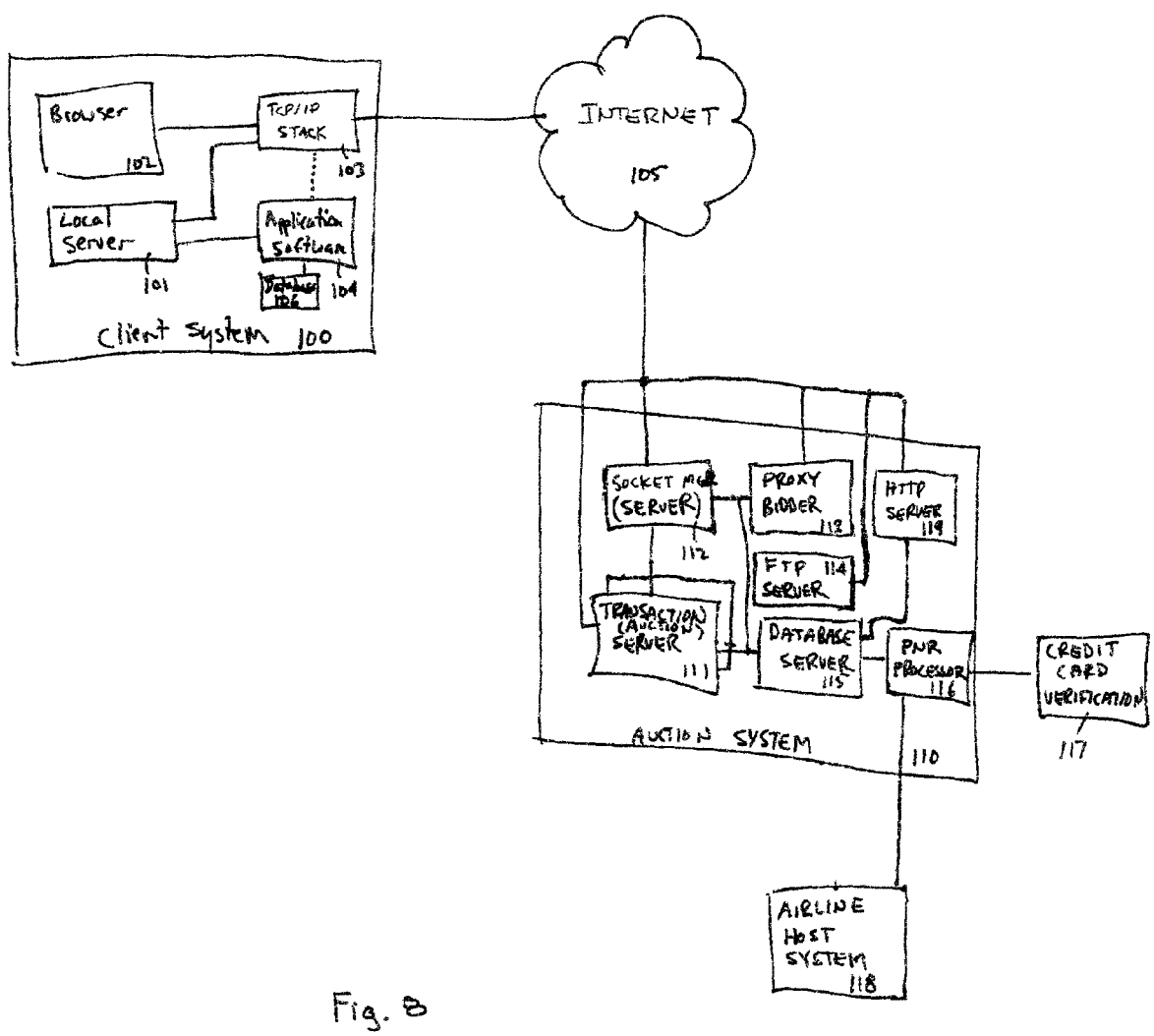
FIG. 8 shows a block diagram of a system architecture.

As shown in FIG. 8, a transaction server 111 preferably directly accesses the airline's designated auction inventory in the airline host yield management system through the database server 115. If inventory is available, the auction will create a temporary database for each city-pair through which it will offer this inventory for the duration of a four-minute auction. The airline may allocate inventory for an auction at any time and in any quantity. Thus, the airline may release inventory periodically through the auction system, either uniformly or in a manner anticipated to coincide with peak demand and therefore peak pricing, or based on sales volume and pricing made through other venues.

The system preferably implements any restrictions or rules defined by the airline, which are initially implemented by the application software 104 in the client system 100, and checked for consistency by the transaction server 111 and/or database server 115. Typically, the tickets are non-refundable, but may be subject to penalty for permissible change. The tickets sold may be one way, or round trip with permissible combinations defined by rules.

Figure 2:
FIG. 2 shows an auction schedule bulletin board.

To assist in scheduling, an auction bulletin board screen 5 provides a schedule of auction content and times, as shown in FIG. 2.

The default city-pair shown in the dropdown box 4 at the top of the screen automatically displays the gateway city-pair located in the closest proximity to the bidder's residence, as provided during the registration process. This drop down box 4 lists all the available gateway city-pairs as options. The bidder then selects a gateway city-pair on which he intends to bid.

Second, a drop down box, under the departure date heading 8, displays the date range of the auction currently in progress. When the bidder clicks on the arrow 45, a calendar (not shown) is displayed, from which the bidder will select a desired departure date. To make this selection, the bidder will click on a date shown on the calendar, and may move between the months by clicking on arrows displayed at the top of the calendar. Once a departure date 8 has been selected, all available flights 13 from this gateway, for this chosen date, will be displayed in the window below this box.

The bidder then selects one of the departure flights 13 shown. This is accomplished by clicking on the box 46 next to the flight listed. In a round trip auction, once a date has been selected, all the valid return flights 14 for this selected outbound flight 46 will be displayed in the window under the Return Dates heading 9. The auction application is designed to incorporate any flight rules and/or restrictions that the airline wishes to impose.

Third, the bidder will select one or several of the return flights 14 shown in this window. As the bidder selects his flights, they will be displayed in the bottom window 15 of the selection screen. For an auction, the bidder may select any combination of departure dates and return flights within the auction's one-week date range up to a total of ten flights per auction. Of course, such a limit is imposed primarily to provide an uncluttered display, and alternative displays may also be employed.

A bidder may also make similar selections in upcoming auctions by simply selecting a departure date 8 in another week or subsequent weeks within a 12-week time frame.

In order to reduce the number of bidders in any particular auction, the number of flights offered may be limited, for example, to one week of outbound flights and four weeks of return flights for each departing city-pair of the airline's flight schedule.

Additionally, a bidder may choose to participate in multiple auctions simultaneously. He may do so by returning to the top of the screen and selecting another gateway city-pair 4 and then repeating the above steps, or by programming a proxy bidder by selecting the proxy bid button 18, described below.

Displayed on the right hand side of the selection screen is a box showing a list of travel companions 12, the names of which were previously entered by the bidder when he registered. This is the default passenger list. Above this list is the name of the registered auction bidder 11. Since, in a consumer auction, the registered bidder 11 must be one of the passengers, this name will always be displayed as selected. If more than one passenger is traveling, the bidder must select his travel companions 12 by clicking on the selection box 47 next to the passenger's name. If the passenger traveling is not shown on the default list, the bidder may add a travel companion by clicking on the Add Companion button 17 located at the bottom of the screen. Clicking on this button will display a pop-up window prompting the bidder to add the name of the additional passenger. Once completed, the bidder clicks on the OK button and this passenger's name will be added to the travel companion list 12 displayed. If more than one passenger name needs to be added, the bidder will repeat the above steps. This selection determines the number of seats that he will be bidding on.

Of course, other rules could be implemented to properly identify the travelers while allowing third parties to negotiate the transaction. Thus, the rules applicable to consumers may be different from rules applicable to agents or aggregators. Further, bidders subject to differing rules may participate in the same auction.

After making all his selections including travel companions, the bidder is ready to join in the auction by clicking on the Auction button 16 at the bottom of the screen.

If he has made at least one selection originating in the date range that is currently being auctioned, he will enter that auction, if it is still in progress. Otherwise, he must wait for the auction to commence.

Figure 4:
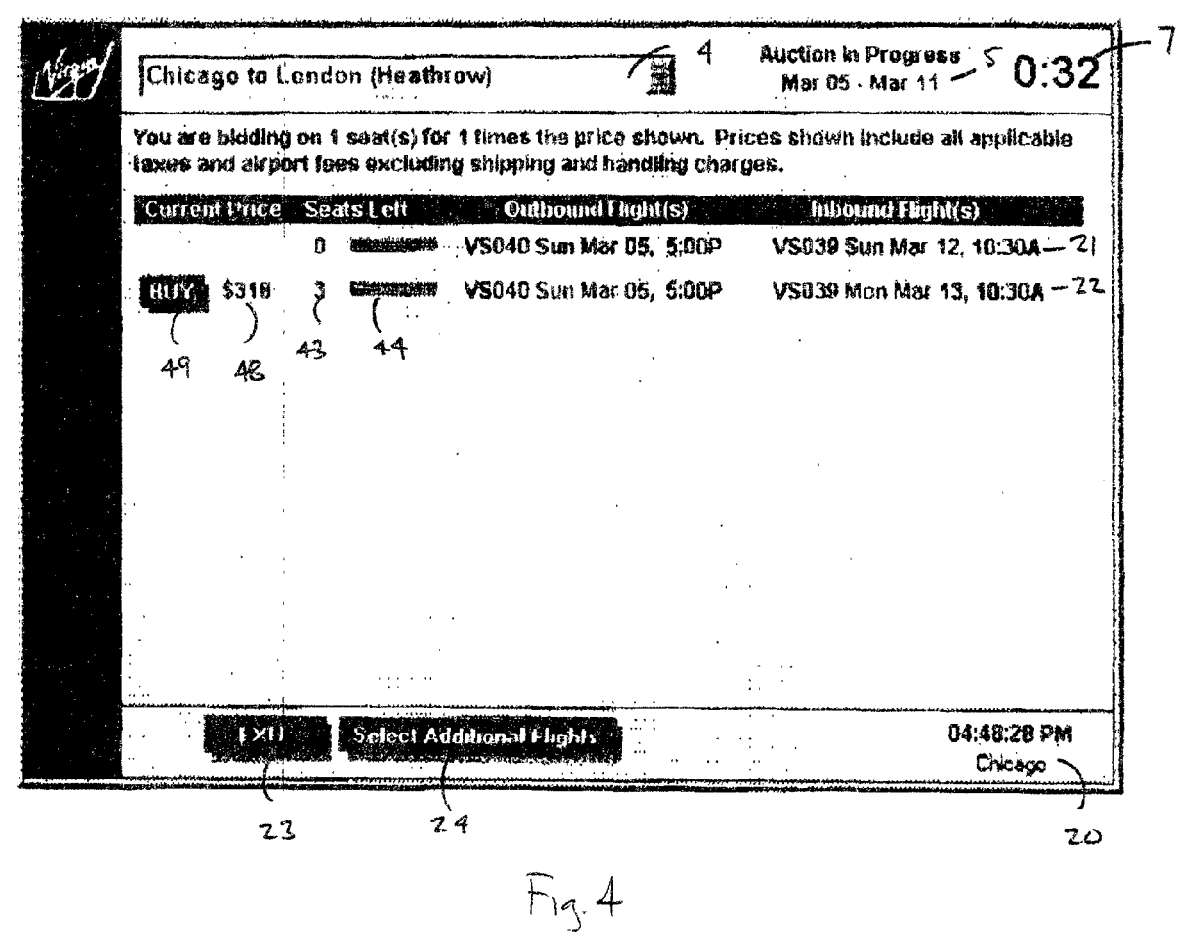

Once in an auction, the bidder will see a screen, as shown in FIG. 4, displaying all the flights 21, 22, he previously selected to bid on along with the currently offered price 48. The number of seats still available 43 may also be displayed or if that number is not specified, the bidder will see a horizontal bar 44 representing the fact that there are seats available for that flight in that auction. In an auction for a round trip, the flight pair is bid on together, and the number of seats left 43 may represent the lower of the inventory for the pair of flights, and the bar 44 show two components for the respective outbound and return flights.

At the top of the Auction screen is a drop-down box displaying the gateway city-pair 4 of the current auction. A countdown clock 7 appears in the upper right corner of the screen, indicating the time remaining before the auction is closed, regardless of remaining inventory.

The bidder may switch from auction to auction, if he has made bidding selections from multiple gateway city-pairs and/or departure dates, by selecting the gateway city-pair 4 he wishes to view from this drop down box. In doing so, the window will then display the auction selections from the newly selected gateway city-pair 4.

As the auction time continues to countdown to zero, the bidder will watch the offered price 48 drop over time. Once the price has reached the bidder's desired price point, and if there are seats still available, he will click on the Buy button 49, located to the left of each flight listing. Once he makes a BUY decision by selecting the buy button 49, he will immediately be taken out of the auction and all other selections for that auction will be deleted, thus preventing duplicative purchases, even by proxy bidder. It is also possible to override this feature as necessary, by modifying the associated rule.

In any case, if the bidder wishes to make additional selections during an auction, he may click on the Select Additional Flights 24 button at the bottom of the auction screen. This will return him to the Auction Selection Screen of FIG. 3, where he may choose additional flight selections. After he has completed his selections he will again click on the auction button to return to the action.

Figure 5:
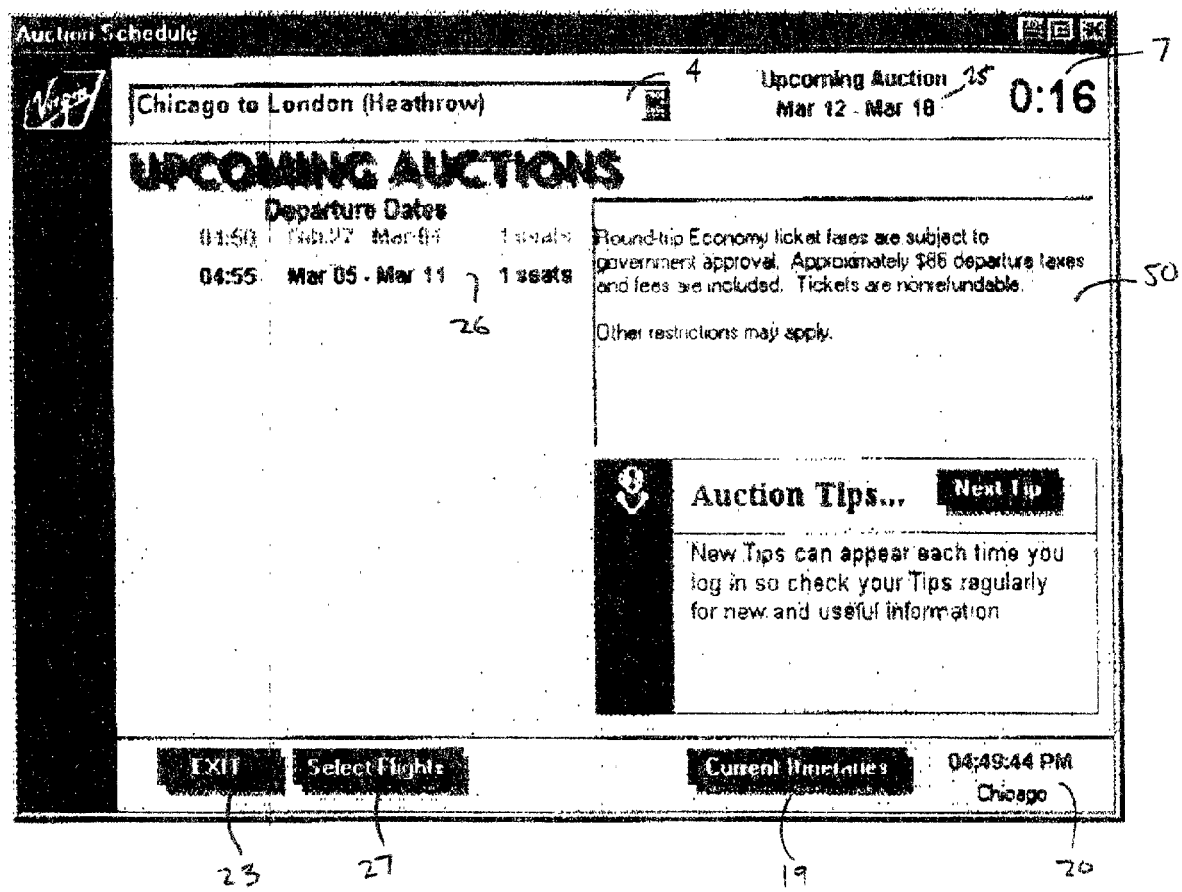
FIG. 5 shows an upcoming auction status screen.

The status of an auction is displayed in the upper right hand corner of the selection screen, the auction screen and the upcoming auctions screen. It displays the time remaining 7 in the current auction along with the date range of the auction 5. If a bidder does not have any selections in the current auction or if the auction is over, the bidder will be taken into the Upcoming Auctions screen, shown in FIG. 5, to await the beginning of the next auction.

The Upcoming Auctions Screen contains the following components. At the top of the screen is the drop-down box displaying the gateway city-pairs 4. In this screen, this box only contains the gateway city-pairs in which the bidder has previously selected flights on which to bid.

Displayed under the Upcoming Auctions heading is a listing of the upcoming auctions in which the bidder has made selections 26, along with the time that the auction will be run and the number of seats he is bidding on.

As the user moves the cursor over this information, time, date ranges and number of seats, a window box 50 on the right hand side of the screen displays the information associated with that data. For example, if the user moves the cursor over the number of seats, the window will display the names of the travelers. If the user moves the cursor over the date range, a list of the individual flights and the flight information will be displayed etc.

From this screen, the bidder may select additional flights to bid on, by clicking on the select flights button 27. The bidder will be taken into the Auction Selection Screen shown in FIG. 3, where he will make his selections. If the bidder has made previous purchases, there will be a Current Itineraries button 19 on the bottom right of the upcoming auction screen. By clicking on this button 19, the bidder can review all other previous purchases that he has made through the auction.

The bidder also has the option of clicking on the Exit button 23, which will return him to the auction home page 1, shown in FIG. 1. This action will also delete any previous auction selections that have been made by the bidder, only for an auction then currently in progress.

After a bidder has made a successful buy, he will be notified immediately of his purchase. A purchase confirmation screen, shown in FIG. 7, will be displayed to him in the form of an itinerary including a break down of the total amount of his purchase. At this time, the bidder indicates the desired delivery method 39 of the travel documents. The credit card reported during the registration process will be charged with the delivery fee and the price of the tickets. The bidder may print a hard copy of this itinerary screen for his records by selecting the print button 42.

By clicking on the return button 41, the bidder will be taken either to the Upcoming Auctions screen (FIG. 5) to wait for any additional auctions in which he may have selections, or he will be taken to the Auction Selection screen (FIG. 3) allowing him to continue to make additional auction selections.

Figure 6:
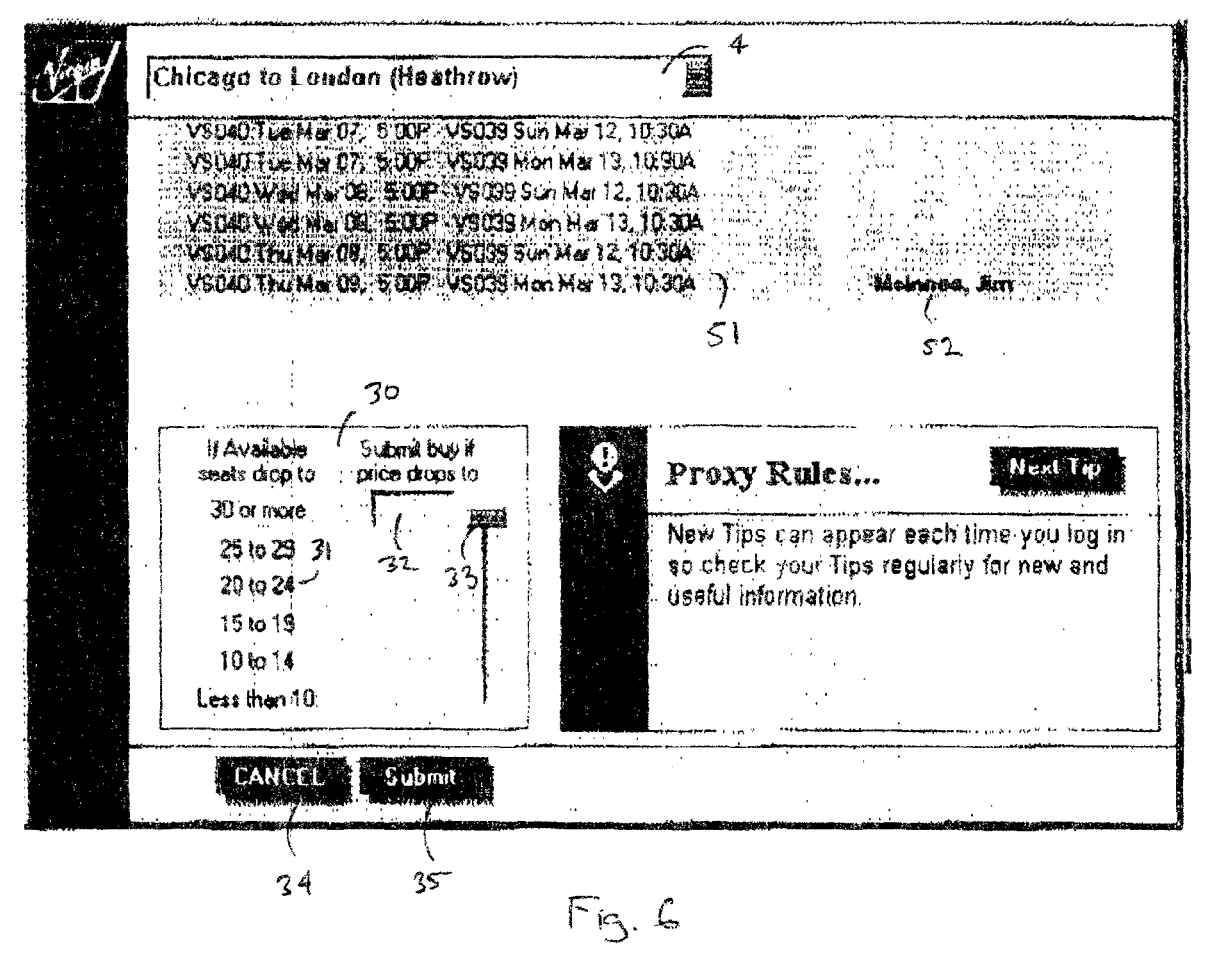

A unique method is provided for allowing the bidder to participate in an auction without actually being online at the time the auction is held. This is termed Proxy bidding. If a bidder is interested in participating in an upcoming auction but will not be available to login during the time scheduled for this auction, he may elect to submit a proxy bid. At the bottom of the Auction Selection screen is a button labeled Proxy Bid 18, the selection of which displays a Proxy Bidding screen, shown in FIG. 6.

A proxy bid covers all selections in an auction for all gateway city-pairs 4. These selections 51 will be displayed at the top of the proxy bid screen along with a list of the passengers 52. In the box displayed in the bottom left corner of this screen 30, the bidder will enter the price 32 he is willing to pay for his tickets. This window also defines the parameters under which he is willing to make this bid. This includes the number of available seats 31 broken into segments. By means of a sliding scale 33, the bidder can specify a range of acceptable bidding prices based on his default price 32. This allows the bidder the flexibility to participate in the auction bidding over a range of prices and available seats.

For example, the bidder may determine a fixed proxy bid price, or a proxy bid price which increases with decreasing available inventory. The bidder may select both the seat inventory segments and price increments. The default system provides a linear price increment over constant size segments of remaining seats.

Figure 3:
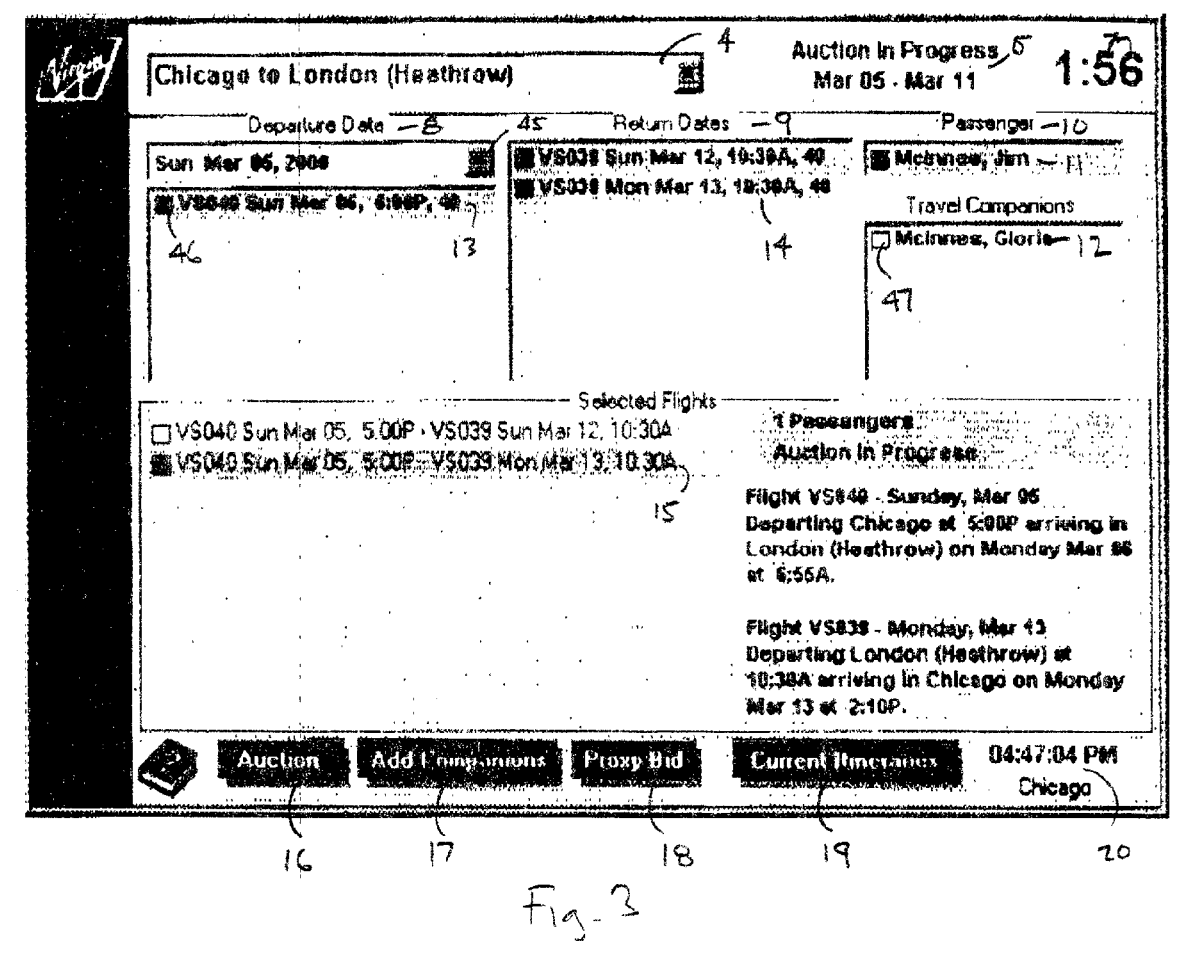

Once the bidder is satisfied with the pricing options he has selected, reviewed his flight options and verified the passenger names, he has two choices. He can submit his proxy bid by clicking on the Submit button 35 or he may cancel his proxy selections by selecting the cancel button 34, which will return him to the Auction Selection screen, as shown in FIG. 3. If the bidder elects to continue with his proxy bid, he will click on the Submit button 35. This will transmit his proxy bid information to a proxy server 113 located proximate to the auction system 110. This proxy server 113 is dedicated to storing all proxy bidding data and functioning as an absentee bidder by participating in individual auctions on behalf of its bidders. This proxy presents a number of advantages to the bidder. Since it is proximate to the transaction server 111, latencies will be short. Other than conflicts from other proxy bidders, a proxy bid will almost always be submitted and accepted before a live bid under the same terms.

Any successful purchases resulting from a proxy bid are final and cannot be canceled. The proxy server will notify the bidder of his successful bid by means of an email. Tickets purchased by means of a proxy bid will be sent to the bidder, for example, via overnight mail or by other selected or default shipping option.

Therefore, the proxy bid provides the option for a sliding scale bid based on remaining inventory. The less remaining inventory, the higher the bid price. Thus, the bidder may select a certain strategy to optimize the price paid.

FIG. 9 describes an algorithm for determining a current price of a seat in a particular auction based on time increment (tick), price spread (initial price minus lowest acceptable price), final price, total time (total ticks), previous price (which is, according to this embodiment, determined adaptively during the course of the auction), total seats sold, and original inventory.

This formula is:

[(TOTAL TICK−CURRENT TICK)/TOTAL TICK×
(OPENING PRICE−FINAL PRICE)+FINAL
PRICE]+[(CURRENT TICK/TOTAL TICK)×
(OPENING PRICE−PREVIOUS PRICE)]×
[((TOTAL SEAT SOLD×(OPENING PRICE/
FINAL PRICE+1))×(TOTAL TICKS−
(CURRENT TICK−1)/TOTAL TICKS)/
ORIGINAL INVENTORY]

Although various preferred embodiments of the present invention have been described herein in detail, it will be appreciated by those skilled in the art, that variations may be made thereto without departing from the spirit of the invention or the scope of the appended claims.

What is claimed is:

1. An auction method, comprising:
   (a) identifying at least one lot to be auctioned, having a plurality of units within the lot and associated auction parameters;
   (b) transmitting a remaining quantity of units within the lot from a central server to a plurality of remote locations;
   (c) receiving bid identifications for remaining units within the lot at the contemporaneous offering price from the plurality of remote locations by communicating between a set of users and a plurality remote servers at respective remote locations to interactively define the bid identifications, and communicating the defined bid identifications between the remote location and the central server substantially without interactive communications directly between the user and the central server; and
   (d) decrementing the offering price over time.

2. The method according to claim 1, wherein the remote server communicates with a user by means of a hypertext language protocol.

3. An auction method, comprising:
   (a) identifying at least one lot to be auctioned, having a plurality of units within the lot and associated auction parameters;
   (b) transmitting a remaining quantity of units within the lot from a central server to a plurality of remote locations;
   (c) automatically maintaining synchronization of a clock at each remote location and receiving at the central server bid identifications for remaining units within the lot at the contemporaneous offering price associated with a time of bid identification from the plurality of remote locations;
   (d) decrementing the offering price over time and decrementing the quantity of remaining units, prioritizing award of units based on the time of bid identification, if received within a bid time window; and
   (e) storing a bid activity pattern in a database.

4. The auction method according to claim 3, wherein the stored bid pattern activity is analyzed to determine an optimal set of auction parameters for a subsequent auction of a similar lot.

5. The auction method according to claim 4, wherein the price is decremented over time in a pattern adaptive to a bid activity pattern.

6. The auction method according to claim 5, wherein the auction parameters define an auction starting price and parameters of an adaptive decrement algorithm.

7. The auction method according to claim 5, wherein the auction is conducted according to a predetermined schedule.

8. The auction method according to claim 3, wherein the central server and the local server communicate using Internet Protocol packets, and the local server and the remote location communicate using Internet Protocol sockets, the local server translating a format of information communicated between the central server and the remote location.

9. A method for conducting an auction, comprising the steps of:
   identifying a plural quantity of subject for auction;
   specifying a temporal parameter for an auction, selected from the group consisting of starting time, ending time, time dilation rule, auction cessation rule, and time-price relationship;
   providing a seller yield management system to define a set of supply parameters, including non-zero reserve and available quantity of subject;
   receiving buyer demand-utility function from a plurality of prospective buyers, each buyer demand-utility function defining the respective buyer's bid;
   over a period of time, generally relaxing a limiting restriction on acceptable transaction parameters for the subject, and prioritizing an award of a quantity of subject to a respective buyer based on a sequence of generation of bids, if received within a bid time window, wherein the sequence is determined based on an automatically synchronized timebase, which maximizes a seller utility; and ending the auction upon the earlier of an expiration of the auction, exhaustion of available quantity, or a surplus of the reserve over all prospective buyer's bids.

10. The method according to claim 9, wherein the subject of the auction represents an airline ticket.

11. The method according to claim 9, wherein the specified temporal parameter comprises a starting time, and a declining price over time rule.

12. The method according to claim 9, wherein a buyer demand-utility function comprises a maximum bid price based on quantity of subject remaining.

13. The method according to claim 9, wherein a buyer demand-utility function comprises a non-uniform maximum bid price per incremental unit of subject available and a minimum quantity desired for purchase.

14. The method according to claim 9, wherein a buyer demand-utility function is a function of subject quantity remaining.

15. The method according to claim 9, wherein the yield management system adaptively defines a quantity of subject for auction and a reserve price to optimize overall profits to seller based on time of auction, an inventory remaining prior to auction, and anticipated market conditions defining demand for the subject.

16. A method for conducting a transaction, comprising the steps of:
identifying a subject;
specifying a set of rules relating to a transaction involving the subject;
implementing the set of rules of transaction proximate to a client for ensuring compliance with each of said rules;
efficiently communicating transaction information from the client to a server complying with said rules; and
receiving, at said server, transaction information from a client,
wherein the rules provide for temporal variations in permissible transaction parameters.

17. The method according to claim 16, wherein the rules define an auction.

18. The method according to claim 16, wherein the rules define a descending price auction for multiple subjects.

19. A method for conducting a transaction, comprising the steps of:
identifying a subject;
specifying a set of rules relating to a transaction involving the subject;
implementing the set of rules of transaction proximate to a client for ensuring compliance with each of said rules;
efficiently communicating transaction information from the client to a server complying with said rules; and
receiving, at said server, transaction information from a client,
wherein the subject is a travel ticket.

20. The method according to claim 19, wherein the subject is a round trip airline ticket, wherein the rules implement stopover restrictions.

21. A method for conducting a transaction, comprising the steps of:
identifying a subject;
specifying a set of rules relating to a transaction involving the subject;
implementing the set of rules of transaction proximate to a client for ensuring compliance with each of said rules;
efficiently communicating transaction information from the client to a server complying with said rules; and
receiving, at said server, transaction information from a client,
wherein the rules prevent inconsistent itineraries.

22. The method according to claim 16, wherein the transaction information is transmitted from the client to the server as compressed information in an information packet.

23. The method according to claim 16, wherein the client and server communicate through the Internet.

24. The method according to claim 16, further comprising the step of transmitting information from the server to the client relating to the subject, as a parameter for implementation of the rules.

25. The method according to claim 16, further comprising the step of altering a number of available subjects for transaction over time.

26. The method according to claim 16, wherein the rules comprise a starting time, and a declining price over time.

27. The method according to claim 16, wherein the transaction information comprises a buyer demand-utility function.

28. A method for conducting a transaction, comprising the steps of:
identifying a subject;
specifying a set of rules relating to a transaction involving the subject;
implementing the set of rules of transaction proximate to a client for ensuring compliance with each of said rules;
efficiently communicating transaction information from the client to a server complying with said rules; and
receiving, at said server, transaction information from a client,
wherein a buyer demand-utility function comprises a non-uniform maximum bid price per incremental unit of subject available and a minimum quantity desired for purchase.

29. The method according to claim 19, wherein the rules implement a yield management system.

30. The method according to claim 19, wherein the server transmits parameters to the client for implementation of a yield management system.

31. A method for conducting a transaction, comprising the steps of:
identifying a subject;
specifying a set of rules relating to a transaction involving the subject;
implementing the set of rules of transaction proximate to a client for ensuring compliance with each of said rules;
efficiently communicating transaction information from the client to a server complying with said rules; and
receiving, at said server, transaction information from a client,
wherein the server identifies a quantity of subject available for transaction and a minimum price of transaction using an airline ticket yield management system to optimize overall profits to seller based on chronology, an inventory of subject remaining, and anticipated market conditions defining demand for the subject.

* * * * *